US012083453B2

(12) United States Patent
Powell et al.

(10) Patent No.: US 12,083,453 B2
(45) Date of Patent: Sep. 10, 2024

(54) METHODS AND SYSTEMS FOR DEWATERING SOLID PARTICLES IN A CONTAMINATED LIQUID MIXTURE

(71) Applicant: 1934612 ONTARIO INC., London (CA)

(72) Inventors: Anthony L. Powell, London (CA); Brian E. Butters, London (CA)

(73) Assignee: 1934612 ONTARIO INC., London (CA)

( * ) Notice: Subject to any disclaimer, the term of this patent is extended or adjusted under 35 U.S.C. 154(b) by 0 days.

(21) Appl. No.: 17/941,647

(22) Filed: Sep. 9, 2022

(65) Prior Publication Data

US 2023/0001335 A1 Jan. 5, 2023

Related U.S. Application Data

(62) Division of application No. 15/261,481, filed on Sep. 9, 2016, now abandoned.
(Continued)

(51) Int. Cl.
*B01D 29/72* (2006.01)
*B01D 29/11* (2006.01)
(Continued)

(52) U.S. Cl.
CPC ............ *B01D 29/72* (2013.01); *B01D 29/114* (2013.01); *B01D 29/52* (2013.01); *B01D 29/603* (2013.01);
(Continued)

(58) Field of Classification Search
None
See application file for complete search history.

(56) References Cited

U.S. PATENT DOCUMENTS 502,511 A * 8/1893 Easton et al. .......... B01D 29/15
210/232
656,908 A * 8/1900 Taylor ..................... D06F 37/24
210/365
(Continued)

FOREIGN PATENT DOCUMENTS

AU 2022211866 A1 * 9/2022 ........... B01D 29/114
CA 2998285 A1 * 3/2017 ........... B01D 29/114
(Continued)

OTHER PUBLICATIONS

Nicholas S. Siefert, "Shockwave Interactions With Argon Glow Discharges", Thesis, Department of the Air Force, Air University, Air Force Institute of Technology, Write-Patterson Air Force Base, Ohio, Mar. 2006, 92 pages.
(Continued)

*Primary Examiner* — Robert J Popovics
(74) *Attorney, Agent, or Firm* — Baker & McKenzie LLP

(57) ABSTRACT

The present disclosure relates, according to some embodiments, to methods, systems, and apparatuses for dewatering solid particles in a liquid mixture, such as those, for example, comprising receiving a liquid mixture, the liquid mixture including solid particles; suspending a filter in the liquid mixture; agglomerating, at the filter, solid particles in the liquid mixture, the agglomerating including potentiating passage of liquid in the liquid mixture through the filter and potentiating accumulation of solid particles in the liquid mixture to collect and agglomerate at the filter; and applying a shockwave to the filter, the applied shockwave operable to remove the agglomerated solid particles from the filter.

6 Claims, 10 Drawing Sheets

US 12,083,453 B2
Page 2

Related U.S. Application Data

(60) Provisional application No. 62/216,972, filed on Sep. 10, 2015.

(51) Int. Cl.
*B01D 29/52* (2006.01)
*B01D 29/60* (2006.01)
*B01D 29/66* (2006.01)
*B01D 29/96* (2006.01)
*B01D 41/04* (2006.01)
*B08B 7/02* (2006.01)
*C02F 1/00* (2023.01)

(52) U.S. Cl.
CPC ............. *B01D 29/66* (2013.01); *B01D 29/96* (2013.01); *B01D 41/04* (2013.01); *B08B 7/02* (2013.01); *C02F 1/001* (2013.01); *C02F 2209/10* (2013.01); *C02F 2209/40* (2013.01); *C02F 2303/16* (2013.01)

(56) References Cited

U.S. PATENT DOCUMENTS

| | | | | |
|---|---|---|---|---|
| 709,616 A | * | 9/1902 | Thorne | B04B 11/04 210/209 |
| 717,912 A | * | 1/1903 | Peck | B01D 29/31 210/318 |
| 748,088 A | * | 12/1903 | Moore | B01D 29/15 210/237 |
| 808,924 A | * | 1/1906 | Hollis | B04B 11/04 210/323.2 |
| 956,366 A | * | 4/1910 | Knock | B01D 25/26 210/237 |
| 1,051,620 A | | 1/1913 | Neil | |
| 1,207,776 A | * | 12/1916 | Mcdonald | B04B 11/04 210/324 |
| 1,271,925 A | * | 7/1918 | Moore | C02F 1/76 210/197 |
| 1,305,317 A | * | 6/1919 | Sweetland | B01D 29/15 210/237 |
| 1,404,667 A | * | 1/1922 | Stevens | B01D 24/12 210/323.2 |
| 1,667,465 A | * | 4/1928 | Wait | B01D 33/466 210/791 |
| 1,678,704 A | | 7/1928 | Morrison | |
| 1,724,436 A | * | 8/1929 | Sweetland | B01D 29/11 210/323.2 |
| 1,794,281 A | * | 2/1931 | Dorfner | B01D 25/26 210/237 |
| 2,032,140 A | * | 2/1936 | Nash | B01D 29/15 210/232 |
| 2,081,009 A | * | 5/1937 | Kelley | B01D 35/18 210/313 |
| 2,354,623 A | * | 7/1944 | Tietig | B01D 35/0276 222/626 |
| 2,442,818 A | * | 6/1948 | Lyman | B01D 29/117 210/454 |
| 2,475,561 A | * | 7/1949 | Cooperider et al. | B01D 33/21 210/324 |
| 2,523,793 A | * | 9/1950 | Vance | B01D 17/0202 210/DIG. 5 |
| 2,562,699 A | * | 7/1951 | Cooperson | B01D 37/02 210/411 |
| 2,731,107 A | * | 1/1953 | Hersey, Jr. | B01D 29/15 55/284 |
| 2,654,482 A | * | 10/1953 | James | B01D 29/908 210/356 |
| 2,693,882 A | * | 11/1954 | Ebert | B01D 29/52 210/345 |
| 2,780,363 A | * | 3/1957 | Pew | B01D 29/66 210/411 |
| 2,784,846 A | * | 3/1957 | Ebert | B01D 29/52 210/456 |
| 2,848,112 A | * | 8/1958 | Hass | B01D 29/66 210/333.01 |
| 2,862,622 A | * | 12/1958 | Jones | B01D 29/66 210/411 |
| 2,872,044 A | * | 2/1959 | Kasten | B01D 25/00 210/488 |
| 2,874,848 A | * | 2/1959 | Cannon | B01D 29/72 55/300 |
| 2,901,115 A | * | 8/1959 | Ledford | B01D 35/16 210/785 |
| 2,909,285 A | * | 10/1959 | Besler | B01D 29/94 210/330 |
| 2,921,686 A | * | 1/1960 | Forman | B01D 29/114 210/345 |
| 3,034,652 A | * | 5/1962 | Hobson, Jr. | B01D 29/52 210/232 |
| 3,042,214 A | * | 7/1962 | Arvanitakis | B01D 35/16 210/330 |
| 3,055,290 A | * | 9/1962 | Arvanitakis | B01D 33/0183 210/407 |
| 3,100,190 A | * | 8/1963 | Hobson, Jr. | B01D 29/52 210/497.1 |
| 3,155,613 A | * | 11/1964 | Felix | B01D 35/20 210/232 |
| 3,169,109 A | * | 2/1965 | Hirs | B01D 35/12 210/138 |
| 3,204,766 A | * | 9/1965 | Schmidt, Jr. | B01D 29/606 210/90 |
| 3,212,643 A | * | 10/1965 | Zievers | B01D 29/72 55/300 |
| 3,240,338 A | * | 3/1966 | Borre | B01D 29/603 137/625.5 |
| 3,262,568 A | * | 7/1966 | Zehrbach | B01D 29/114 210/138 |
| 3,280,978 A | * | 10/1966 | Winfield | B01D 29/885 210/408 |
| 3,310,175 A | * | 3/1967 | Mclagan | B01D 37/02 55/296 |
| 3,356,215 A | * | 12/1967 | Miles, Jr. | B01D 37/04 210/333.1 |
| 3,399,777 A | * | 9/1968 | Passalaqua | B01D 35/20 210/486 |
| 3,416,669 A | * | 12/1968 | Hubbard | B01D 29/668 210/411 |
| 3,422,958 A | * | 1/1969 | Newman | B01D 35/16 210/457 |
| 3,447,690 A | * | 6/1969 | Kracklauer | B01D 29/6484 55/299 |
| 3,482,700 A | * | 12/1969 | Bebech | B01D 29/72 210/407 |
| 3,499,535 A | * | 3/1970 | Riley | B01D 29/72 210/346 |
| 3,591,008 A | * | 7/1971 | Diefenbach | B01D 29/70 210/237 |
| 3,642,141 A | * | 2/1972 | Hobson, Jr. | B01D 29/15 210/457 |
| 3,726,066 A | * | 4/1973 | Colley | B01D 50/20 55/341.6 |
| 3,796,316 A | * | 3/1974 | Matz | B01D 29/52 100/116 |
| 3,853,509 A | * | 12/1974 | Leliaert | B01D 46/71 55/378 |
| 3,867,291 A | * | 2/1975 | Schmidt, Jr. | B01D 29/39 55/300 |
| 3,890,233 A | * | 6/1975 | Gischel | B01D 35/32 976/DIG. 266 |
| 3,891,551 A | * | 6/1975 | Tiedemann | B01D 29/661 210/323.1 |
| 3,935,105 A | * | 1/1976 | McEwen | B01D 21/245 210/138 |
| 3,970,564 A | * | 7/1976 | Shamsutdinov | B01D 29/41 210/791 |
| 4,116,838 A | | 9/1978 | Lazzarotto | |
| 4,153,552 A | * | 5/1979 | Muther | B01D 29/66 210/427 |

(56) References Cited

U.S. PATENT DOCUMENTS

| | | | |
|---|---|---|---|
| 4,217,700 A * | 8/1980 | Muller | B01D 29/114 210/771 |
| 4,237,011 A * | 12/1980 | Acosta | B01D 29/52 248/500 |
| 4,243,533 A * | 1/1981 | Savolainen | B01D 29/54 210/309 |
| 4,251,244 A * | 2/1981 | Evenstad | B01D 46/0005 55/379 |
| 4,265,771 A * | 5/1981 | Lennartz | B01D 29/72 210/791 |
| 4,277,349 A * | 7/1981 | Schwinghammer | B01D 29/114 134/113 |
| 4,278,454 A * | 7/1981 | Nemesi | B01D 50/20 55/498 |
| 4,289,630 A * | 9/1981 | Schmidt, Jr. | B01D 29/843 55/300 |
| 4,419,234 A * | 12/1983 | Miller | B01D 29/15 210/232 |
| 4,436,633 A * | 3/1984 | Robinsky | B01D 29/44 210/791 |
| 4,500,435 A | 2/1985 | Muller | |
| 4,507,130 A * | 3/1985 | Roth | B01D 46/58 55/284 |
| 4,517,086 A * | 5/1985 | Romey | B01D 29/72 210/334 |
| 4,525,274 A * | 6/1985 | Willus | B01D 29/885 210/333.1 |
| 4,526,688 A * | 7/1985 | Schmidt, Jr. | B01D 29/15 210/489 |
| 4,547,296 A * | 10/1985 | Sim | B01D 29/114 210/323.2 |
| 4,552,669 A * | 11/1985 | Sekellick | B01D 29/35 210/323.2 |
| 4,560,483 A * | 12/1985 | Warning | B01D 29/668 210/489 |
| 4,591,446 A * | 5/1986 | Muller | B01D 29/52 261/76 |
| 4,592,847 A * | 6/1986 | Schumacher | B01D 29/80 210/186 |
| 4,604,201 A * | 8/1986 | Muller | B01D 29/19 210/323.2 |
| 4,649,760 A * | 3/1987 | Wedding | G05D 7/01 73/861.64 |
| 4,650,580 A * | 3/1987 | Schumacher | B01D 29/111 427/244 |
| 4,704,210 A * | 11/1987 | Boze | B01D 35/12 210/497.1 |
| 4,728,423 A * | 3/1988 | Kuwajima | B01D 29/114 210/438 |
| 4,741,841 A * | 5/1988 | Borre | B01D 33/722 55/304 |
| 4,781,825 A * | 11/1988 | Grimes | B01D 29/114 55/284 |
| 4,804,481 A * | 2/1989 | Lennartz | B01D 29/52 210/791 |
| 4,830,747 A * | 5/1989 | Kubota | B01D 29/48 134/22.12 |
| 4,872,981 A | 10/1989 | Hobson, Jr. | |
| 4,872,988 A * | 10/1989 | Culkin | B01D 65/08 210/791 |
| 4,874,533 A * | 10/1989 | Boze | B01D 37/02 210/411 |
| 4,909,813 A * | 3/1990 | Eggerstedt | B01D 46/71 55/525 |
| 4,919,801 A | 4/1990 | Hobson, Jr. | |
| 4,944,887 A * | 7/1990 | Frederick | B01D 29/70 210/791 |
| 4,952,317 A * | 8/1990 | Culkin | B01D 63/16 210/636 |
| 4,957,625 A * | 9/1990 | Katoh | B01D 29/52 210/123 |
| 4,963,271 A * | 10/1990 | Raehse | B01D 29/78 210/772 |
| 4,969,937 A * | 11/1990 | Tassicker | B01D 46/2407 55/508 |
| 5,008,009 A * | 4/1991 | Ciaffoni | B01D 29/114 210/441 |
| 5,084,176 A | 1/1992 | Davis et al. | |
| 5,085,771 A * | 2/1992 | Huang | B01D 29/52 210/512.3 |
| 5,114,596 A * | 5/1992 | Laterra | B01D 29/114 134/22.12 |
| 5,176,826 A * | 1/1993 | Rosaen | B01D 33/033 210/450 |
| 5,192,456 A * | 3/1993 | Ishida | B01D 65/00 210/791 |
| 5,207,930 A * | 5/1993 | Kannan | B01D 29/114 210/356 |
| 5,213,687 A | 5/1993 | Ginn et al. | |
| 5,223,155 A * | 6/1993 | Ginn | B01D 39/2068 210/791 |
| 5,227,076 A * | 7/1993 | Bogen | B01D 29/66 210/791 |
| 5,230,131 A * | 7/1993 | Hobson, Jr. | B01D 29/96 29/402.06 |
| 5,397,465 A * | 3/1995 | Stewart | B01D 29/39 210/167.13 |
| 5,407,570 A * | 4/1995 | Hobson, Jr. | B01D 29/15 210/232 |
| 5,421,845 A * | 6/1995 | Gregg | B01D 46/04 55/294 |
| 5,437,788 A * | 8/1995 | Geibel | B01D 29/661 210/411 |
| 5,441,633 A * | 8/1995 | Schewitz | B01D 29/908 210/323.2 |
| 5,441,651 A * | 8/1995 | Yamaguchi | B01D 29/52 210/462 |
| 5,462,674 A * | 10/1995 | Butters | C02F 1/325 210/791 |
| 5,494,591 A * | 2/1996 | Stamm | B01D 29/114 210/791 |
| 5,498,349 A * | 3/1996 | Kurahashi | B01D 29/606 210/411 |
| 5,545,338 A * | 8/1996 | Ginn | B01D 29/39 210/791 |
| 5,547,574 A * | 8/1996 | Ginn | B01D 29/66 210/333.1 |
| 5,589,078 A | 12/1996 | Butters et al. | |
| 5,618,443 A * | 4/1997 | Engdahl | B01D 29/606 210/197 |
| 5,620,596 A * | 4/1997 | Engdahl | B01D 29/843 210/197 |
| 5,628,916 A * | 5/1997 | Stevens | B01D 29/52 210/799 |
| 5,653,889 A * | 8/1997 | Buchanan | B01D 29/668 210/791 |
| 5,728,307 A * | 3/1998 | Goltermann | B01D 25/34 210/791 |
| 5,759,397 A * | 6/1998 | Larsson | B01D 37/02 210/402 |
| 5,766,486 A * | 6/1998 | Cathcart | B01D 46/70 210/791 |
| 5,792,353 A * | 8/1998 | Jungi | B01D 29/48 210/357 |
| 5,800,580 A * | 9/1998 | Feldt | B01D 46/06 55/378 |
| 5,858,217 A * | 1/1999 | Redl | B01D 29/52 210/414 |
| 5,925,258 A * | 7/1999 | Pryor | B01D 29/826 210/791 |
| 5,944,998 A | 8/1999 | Rolchigo et al. | |
| 5,945,006 A * | 8/1999 | Mignani | B01D 29/114 210/411 |
| 5,972,228 A * | 10/1999 | Ingelman | B01D 29/925 210/333.1 |
| 6,004,470 A | 12/1999 | Abril | |

(56) References Cited

U.S. PATENT DOCUMENTS

| | | | | |
|---|---|---|---|---|
| 6,022,388 A * | 2/2000 | Andersson | B01D 46/04 | 95/280 |
| 6,040,491 A * | 3/2000 | Sjowall | G21F 9/04 | 976/DIG. 395 |
| 6,041,944 A * | 3/2000 | Meier | B01D 29/925 | 210/489 |
| 6,051,138 A * | 4/2000 | Hobson, Jr. | B01D 29/72 | 55/379 |
| 6,070,739 A * | 6/2000 | Nagaoka | B01D 29/48 | 210/384 |
| 6,177,006 B1 * | 1/2001 | Nagaoka | C02F 1/004 | 210/330 |
| 6,254,774 B1 * | 7/2001 | Henderson | B01D 29/96 | 376/313 |
| 6,309,552 B1 * | 10/2001 | Hobson, Jr. | B01D 29/52 | 210/791 |
| 6,341,567 B1 * | 1/2002 | Robertson | B01D 46/4263 | 55/482.1 |
| 6,365,054 B1 * | 4/2002 | Kruger | B01D 29/52 | 210/411 |
| 6,409,929 B2 * | 6/2002 | Bott | B01D 35/31 | 210/402 |
| 6,419,835 B1 * | 7/2002 | Virtanen | B01D 33/62 | 210/791 |
| 6,439,273 B1 * | 8/2002 | Kruger | B01D 29/114 | 141/69 |
| 6,495,037 B1 | 12/2002 | Schuyler | | |
| 6,616,843 B1 | 9/2003 | Behmann et al. | | |
| 6,706,182 B2 * | 3/2004 | Schuyler | B01D 29/21 | 210/493.1 |
| 6,709,586 B2 * | 3/2004 | Mason | B01D 29/70 | 210/411 |
| 6,830,679 B2 * | 12/2004 | Tsuihiji | B01D 29/39 | 210/411 |
| 6,872,310 B2 * | 3/2005 | Trotzki | B01D 29/52 | 210/345 |
| 6,982,037 B2 * | 1/2006 | Horng | B01D 65/08 | 210/615 |
| 7,074,338 B2 * | 7/2006 | Mizuno | B01D 29/15 | 210/791 |
| 7,081,207 B2 | 7/2006 | Kangasniemi et al. | | |
| 7,241,383 B2 * | 7/2007 | Katano | B01D 29/66 | 210/411 |
| 7,282,147 B2 * | 10/2007 | Kirker | C02F 1/44 | 210/321.67 |
| 7,297,278 B2 * | 11/2007 | Steele | C02F 1/444 | 210/705 |
| 7,297,279 B2 * | 11/2007 | Johnson | B01D 17/045 | 210/DIG. 5 |
| 7,381,323 B2 * | 6/2008 | Umezawa | B01D 61/147 | 210/791 |
| 7,445,716 B2 * | 11/2008 | Quintel | B01D 29/52 | 210/636 |
| 7,488,426 B1 | 2/2009 | Zaiter | | |
| 7,572,373 B2 * | 8/2009 | El-Hindi | B01D 29/15 | 210/232 |
| 7,722,767 B2 * | 5/2010 | Quintel | B01D 29/865 | 210/485 |
| 7,981,293 B2 * | 7/2011 | Powell | B01D 61/18 | 210/534 |
| 7,981,301 B2 | 7/2011 | Powell | | |
| 8,021,467 B2 * | 9/2011 | Zimmer | B01D 46/58 | 55/284 |
| 8,029,680 B2 * | 10/2011 | Shinoda | B01D 29/48 | 210/777 |
| 8,048,299 B2 * | 11/2011 | Quintel | B01D 37/00 | 210/485 |
| 8,048,319 B2 * | 11/2011 | Smith | G21C 15/182 | 210/167.01 |
| 8,054,932 B2 * | 11/2011 | Smith | C02F 1/001 | 210/167.01 |
| 8,192,617 B2 * | 6/2012 | Powell | C02F 9/00 | 210/197 |
| 8,309,711 B2 * | 11/2012 | Wiley | B01D 29/114 | 210/411 |
| 8,333,893 B2 * | 12/2012 | Chang | C02F 1/36 | 376/310 |
| 8,409,429 B2 * | 4/2013 | Kaske | B01D 29/908 | 210/411 |
| 8,764,975 B2 | 7/2014 | Salmisuo et al. | | |
| 8,771,509 B2 | 7/2014 | Huang et al. | | |
| 8,882,926 B2 * | 11/2014 | Almlie | B01D 46/762 | 134/4 |
| 9,028,622 B2 | 5/2015 | Sun | | |
| 9,108,872 B2 | 8/2015 | Salmisuo et al. | | |
| 9,133,047 B2 * | 9/2015 | Butters | C02F 9/00 | |
| 9,318,227 B2 * | 4/2016 | Harkness | G21C 19/20 | |
| 10,071,927 B2 * | 9/2018 | Butters | B01D 65/08 | |
| 10,406,458 B1 * | 9/2019 | Nehlen, III | B01D 29/90 | |
| 10,434,444 B2 * | 10/2019 | Baniassadi | B01D 29/52 | |
| 10,646,828 B2 * | 5/2020 | Pierson | B01D 65/02 | |
| 10,675,724 B2 * | 6/2020 | Edmondson | B01D 36/045 | |
| 10,814,255 B1 * | 10/2020 | Nehlen, III | B01D 37/02 | |
| 10,814,256 B1 * | 10/2020 | Nehlen, III | B01D 29/15 | |
| 10,850,216 B1 * | 12/2020 | Nehlen, III | B01D 29/15 | |
| 10,905,984 B2 * | 2/2021 | Landwehr | B01D 33/62 | |
| 10,946,315 B2 * | 3/2021 | Hensel | B01D 21/0024 | |
| 10,981,091 B1 * | 4/2021 | Nehlen, III | B01D 29/15 | |
| 11,065,566 B2 * | 7/2021 | Nehlen, III | B01D 29/906 | |
| 11,167,226 B2 * | 11/2021 | Nehlen, III | B01D 37/02 | |
| 11,364,457 B2 * | 6/2022 | Baniassadi | B01D 29/13 | |
| 11,471,798 B2 * | 10/2022 | Vallejo | C02F 1/006 | |
| 11,559,757 B2 * | 1/2023 | Ruzicka | B01D 35/30 | |
| 11,666,847 B2 * | 6/2023 | Hunzeker | B01D 46/681 | 406/197 |
| 11,673,079 B2 * | 6/2023 | Nehlen, III | B01D 37/02 | 210/323.2 |
| 11,679,348 B2 * | 6/2023 | Morin | E21B 43/2607 | 210/791 |
| 11,713,258 B2 * | 8/2023 | Katz | C02F 9/00 | 210/652 |
| 11,717,775 B2 * | 8/2023 | Maiworm | B01D 29/52 | 210/323.1 |
| 11,718,548 B2 * | 8/2023 | Katz | B01D 3/065 | 210/652 |
| 11,745,220 B2 * | 9/2023 | Trifol | B07B 1/28 | 210/791 |
| 11,872,576 B2 * | 1/2024 | Taylor | B05B 1/005 | |
| 2002/0006769 A1 * | 1/2002 | Tsuihiji | B01D 25/164 | 451/87 |
| 2002/0130080 A1 | 9/2002 | Cote et al. | | |
| 2002/0158002 A1 * | 10/2002 | Trotzki | B01D 29/114 | 210/384 |
| 2003/0089647 A1 * | 5/2003 | Tsuihiji | B01D 29/15 | 210/97 |
| 2003/0094426 A1 * | 5/2003 | Umezawa | B24B 55/03 | 210/791 |
| 2003/0095894 A1 * | 5/2003 | Umezawa | B01D 36/045 | 422/400 |
| 2003/0155289 A1 * | 8/2003 | Barnhart | B01D 24/042 | 210/237 |
| 2003/0164342 A1 * | 9/2003 | Mason | B01D 29/661 | 210/323.2 |
| 2004/0262209 A1 * | 12/2004 | Umezawa | B01D 29/66 | 210/216 |
| 2005/0077227 A1 * | 4/2005 | Kirker | B01D 65/08 | 210/321.89 |
| 2005/0145567 A1 * | 7/2005 | Quintel | B01D 37/00 | 210/636 |
| 2006/0108289 A1 * | 5/2006 | Steele | B01D 61/026 | 210/651 |
| 2006/0266685 A1 * | 11/2006 | Umezawa | B01D 37/02 | 210/216 |
| 2006/0266686 A1 * | 11/2006 | Umezawa | B01D 29/39 | 210/216 |
| 2006/0266687 A1 * | 11/2006 | Umezawa | B01D 37/02 | 210/216 |

(56) References Cited

U.S. PATENT DOCUMENTS

| | | | |
|---|---|---|---|
| 2006/0266705 A1* | 11/2006 | Janson | B01D 65/02 210/636 |
| 2008/0271607 A1* | 11/2008 | Mahon | B01D 46/2407 96/421 |
| 2009/0050581 A1* | 2/2009 | Kaske | B01D 21/34 210/313 |
| 2009/0101601 A1* | 4/2009 | Kaske | B01D 29/114 210/411 |
| 2009/0184064 A1 | 7/2009 | Zaiter | |
| 2009/0301304 A1* | 12/2009 | Bass | B01D 46/71 55/381 |
| 2010/0032372 A1* | 2/2010 | Adam | B01D 37/02 210/660 |
| 2010/0126932 A1* | 5/2010 | Powell | C02F 3/102 210/111 |
| 2010/0140180 A1* | 6/2010 | Powell | C02F 9/00 210/243 |
| 2011/0031192 A1* | 2/2011 | Wiley | B01D 65/02 210/209 |
| 2011/0067737 A1 | 3/2011 | Sun | |
| 2011/0198237 A1* | 8/2011 | Powell | C02F 9/00 210/232 |
| 2011/0229276 A1* | 9/2011 | Eder | B01D 46/2407 406/10 |
| 2011/0315619 A1 | 12/2011 | Hormon | |
| 2012/0187043 A1* | 7/2012 | Hashimoto | B01D 61/20 210/636 |
| 2012/0291799 A1* | 11/2012 | Almlie | B01D 46/71 134/4 |
| 2013/0032543 A1* | 2/2013 | Butters | B01D 61/145 210/182 |
| 2013/0256236 A1 | 10/2013 | Huang et al. | |
| 2013/0341270 A1* | 12/2013 | Butters | B01D 61/16 210/189 |
| 2014/0116957 A1* | 5/2014 | Woo | B01D 35/16 210/744 |
| 2015/0053082 A1* | 2/2015 | Almlie | B08B 7/02 95/278 |
| 2015/0183660 A1* | 7/2015 | Wright | B01D 21/2433 210/801 |
| 2016/0083265 A1* | 3/2016 | Wright | B01D 21/0012 210/741 |
| 2016/0367929 A1* | 12/2016 | Moestam | B01D 46/02 |
| 2017/0072344 A1* | 3/2017 | Powell | B01D 41/04 |
| 2018/0021704 A1* | 1/2018 | Hensel | B01D 29/52 210/323.1 |
| 2018/0071667 A1* | 3/2018 | Baniassadi | B01D 35/16 |
| 2018/0136671 A1* | 5/2018 | Appelo | G05D 7/0635 |
| 2018/0161832 A1* | 6/2018 | Almlie | B08B 7/0028 |
| 2018/0318976 A1* | 11/2018 | Edmondson | B01D 21/262 |
| 2019/0201817 A1* | 7/2019 | Morin | B01D 29/96 |
| 2019/0263676 A1* | 8/2019 | Powell | C02F 9/00 |
| 2019/0291028 A1* | 9/2019 | Nehlen, III | B01D 29/90 |
| 2020/0086250 A1* | 3/2020 | Baniassadi | B01D 35/16 |
| 2020/0384388 A1* | 12/2020 | Stuiver | B01D 29/52 |
| 2021/0039023 A1* | 2/2021 | Nehlen, III | B01D 37/02 |
| 2021/0052996 A1* | 2/2021 | Nehlen, III | B01D 29/15 |
| 2021/0229006 A1* | 7/2021 | Nehlen, III | B01D 29/17 |
| 2021/0245078 A1* | 8/2021 | Maiworm | B01D 29/05 |
| 2021/0387114 A1* | 12/2021 | Yamamoto | B08B 7/02 |
| 2022/0143534 A1* | 5/2022 | Vallejo | B01D 29/902 |
| 2022/0233978 A1* | 7/2022 | Stuiver | B01D 29/52 |
| 2023/0001335 A1* | 1/2023 | Powell | B01D 29/603 |

FOREIGN PATENT DOCUMENTS

| | | | | |
|---|---|---|---|---|
| CA | 3007410 A1 | * | 6/2017 | B01D 29/13 |
| JP | S358892 A | | 7/1960 | |
| JP | S57190615 A | | 11/1982 | |
| JP | H075033402 A | | 4/1995 | |
| JP | 2004-321995 A | | 11/2004 | |
| KR | 10-2007-0025919 A | | 3/2007 | |
| KR | 10-2011-0082504 A | | 7/2011 | |
| WO | WO-2017042630 A1 | * | 3/2017 | B01D 29/114 |
| WO | WO-2017100627 A1 | * | 6/2017 | B01D 29/13 |
| WO | WO-2020247806 A1 | * | 12/2020 | B01D 29/15 |

OTHER PUBLICATIONS

Wikipedia, "Shock Wave", https://en.wikipedia.org/wiki/Shock_wave, Mar. 2, 2021, 11 pages.

Fran De Aquino, "Gravitational Shockwave Weapons", Maranhao State University, Physics Department, 2012, https://www.rxiv.org/pdf/1205.0037v1.pdf, 7 pages.

Yinghong Gao et al., "Backpulsing technology applied in MF and UF processes for membrane fouling mitigation: A review", Journal of Membrance Science, https://www.sciencedirect.com/science/article/pii/S0376738819304673, May 30, 2019, 20 pages.

A. I. Erofeev et al., "Momentum and Energy Transfer in a Shock Wave", Plenum Publishing Corporation, 2002, 10 pages.

Alessandro D'Addessi, M.D., et al., "Reviews in Endourology, Extracorporeal Shockwave Lithotripsy in Pediatrics", Journal of Endourology, vol. 22, No. 1, Jan. 2008, 14 pages.

Jai-Hong Cheng, et al., "Biological mechanism of shockwave in bone", International Journal of Surgery, http://www.journal-surgery.net/, Jun. 25, 2015, https://www.sciencedirect.com/science/article/pii/S1743919115003325,143 pages.

International Search Report and Written Opinion dated Dec. 21, 2016 in connection with PCT/IB2016/00406.

Extended European Search Report dated Apr. 25, 2019 in connection with European Application No. 16843735.8, 7 pages.

Examination Report dated Jul. 8, 2020 in connection with European Application No. 16843735.8, 5 pages.

Office Action dated Sep. 1, 2020 in connection with Japanese Application No. 2018-532837, 11 pages.

A Korean Office Action issued by the Korean Intellectual Property Office on Oct. 10, 2023 in connection with Korean patent application No. 10-2018-7010115.

* cited by examiner

METHODS AND SYSTEMS FOR DEWATERING SOLID PARTICLES IN A CONTAMINATED LIQUID MIXTURE

CROSS-REFERENCE TO RELATED APPLICATIONS

This application is a divisional of U.S. patent application Ser. No. 15/261,481 filed on Sep. 9, 2016, which claims priority to U.S. Provisional Patent Application No. 62/216,972 filed on Sep. 10, 2015, the entire contents of which are hereby incorporated in their entirety by reference.

FIELD OF THE DISCLOSURE

The present disclosure relates generally to methods, system, and apparatuses for treating and decontaminating contaminated liquid mixtures, and more particularly, for dewatering solids and/or solid particles contained and/or found in contaminated liquid mixtures or sludges.

BACKGROUND OF THE DISCLOSURE

The present disclosure relates, in some embodiments, to methods and systems for dewatering solid particles in a contaminated liquid mixture. During a dewatering process, filter clogging may occur through agglomeration, accumulation, and/or flocculation of solid particles. Filter clogging may lead to a loss in dewatering process efficiency and may lead to an increase in system maintenance, energy costs, labor costs, filter disposal costs, maintenance downtime, and filter media replacement costs. Further, filter clogging may reduce the life of pump seals, valves, and process equipment.

SUMMARY

The present disclosure relates, in some embodiments to methods, systems, and apparatuses for treating, dewatering, and/or decontaminating contaminated liquid mixtures. For example, methods, systems, apparatuses, and controllers may be used in treating and/or decontaminating liquid mixtures, and more specifically, for use in the dewatering of solids and/or solid particles contained in contaminated liquid mixtures. In some embodiments, the method may be directed to a chemical-free process.

The present disclosure relates, in some embodiments, to methods for dewatering solid particles in a liquid mixture. Methods may comprise, for example, receiving a liquid mixture (e.g., a liquid mixture including solid particles). A method may comprise contacting a filter with a liquid mixture. In some embodiments, a method may comprise agglomerating (or flocculating), at a filter, solid particles in a liquid mixture. Agglomerating (or flocculating) may include potentiating passage of a liquid in a liquid mixture through a filter to form a cake or wet cake (e.g., greater than 15%). Agglomerating (or flocculating) may include potentiating accumulation of solid particles in the liquid mixture to collect and agglomerate (or flocculate) at the filter. A method may comprise applying a shockwave to a filter. An applied shockwave may be operable to remove agglomerated (or flocculated) solid particles from a filter. A method may comprise potentiating passage of a liquid in a liquid mixture through a filter and potentiating accumulation of solid particles in the liquid mixture to collect and (optionally) agglomerate (or flocculate) at the filter by applying a negative pressure. Agglomeration of solid particles before accumulating at the filter may not be required and a method may be automated to continuously perform dewatering of solids and/or solid particles.

In some embodiments, a filter may be connected to an outlet section. In some embodiments, a pressure differential may be applied by introducing a negative pressure between a filter and an outlet section. According to some embodiments, a pressure differential may be applied by introducing a liquid suction between a filter and the outlet section. In some embodiments, a liquid mixture may be housed in a container and a pressure differential may be selectively applied by introducing positive pressure into a container. According to some embodiments, a pressure differential may be selectively applied when a flow rate of liquid passing through a filter exceeds a minimum threshold value. In some embodiments, a pressure differential may be selectively applied based on, for example, thickness, consistency, or other aspects of a layer of solid particles agglomerated at a filter. According to some embodiments, a pressure differential may be applied when agglomerated solid particles may not be removed from a filter. In some embodiments, a pressure differential may be applied on a periodic basis. According to some embodiments, agglomerated solid particles are removed from a filter on a periodic basis. In some embodiments, a filter may be selected based on, for example, size of the solid particles in the liquid mixture.

According to some embodiments, a method for dewatering solid particles in a liquid mixture. A method may comprises receiving a liquid mixture (e.g., a liquid mixture including solid particles). A method may comprise suspending a filter in the liquid mixture. A method may comprise agglomerating (or flocculating), at a filter, solid particles in a liquid mixture. Agglomerating (or flocculating) may include applying a pressure differential to potentiate passage of liquid in the liquid mixture through a filter. Agglomerating (or flocculating) may further include applying a pressure differential to potentiate collection, deposition, agglomeration, and/or flocculation of solid particles in a liquid mixture at a filter. A method may comprise removing agglomerated (or flocculated) solid particles from a filter.

According to some embodiments, a shockwave may be selectively applied when a flow rate of liquid passing through a filter may be below a minimum threshold value. In some embodiments, a shockwave may be selectively applied based on, for example, thickness, consistency, or other aspects of solid particles agglomerated at a filter. According to some embodiments, a shockwave may be applied when liquid in the liquid mixture may be not passing through the filter. In some embodiments, a method may comprise removing a filter from a liquid mixture, wherein a shockwave may be applied when the filter may be removed from the liquid mixture. According to some embodiments, a filter may be connected to an outlet section; and wherein agglomerating includes potentiating passage of liquid passing through a filter to pass to an outlet section. In some embodiments, a liquid passage through the filter may be potentiated by applying a liquid suction. According to some embodiments, a liquid passage through a filter may be potentiated by applying a pressure differential. In some embodiments, a pressure differential may be selectively applied by introducing a negative pressure between a filter and an outlet section. According to some embodiments, a liquid mixture may be housed in a container and a pressure differential may be selectively applied by introducing positive pressure into a container. In some embodiments, a pressure differential may be selectively applied when a flow rate of liquid passing through a filter exceeds a minimum threshold value. According to some embodiments, a pressure differential may be selectively applied based on, for example, thickness, consistency, or other aspects of solid particles agglomerated at a filter. In some embodiments, a liquid passage through a filter may be potentiated on a periodic basis. According to some embodiments, a shockwave may be applied on a periodic basis. A filter may be selected base on, for example, size of solid particles in a liquid mixture, according to some embodiments.

The present disclosure relates, in some embodiments, to systems for dewatering solid particles in a liquid mixture. A system may comprise a filter assembly configured in a dead end manner. A filter assembly may include a filter. A filter may include an outwardly facing exterior surface and an inwardly facing opposing interior surface. A filter may also include a plurality of pores. A plurality of pores may be operable to allow liquid to pass through a filter. A plurality of pores may also be operable to prevent one or more solid particles from passing through a filter. A system may comprise a liquid removal assembly. A liquid removal assembly may be configurable to create an inwardly-directed suction at the pores of a filter. A system may comprise a shockwave assembly. A shockwave assembly may be in communication with a filter. A shockwave assembly may be configurable to apply a shockwave to a filter.

According to some embodiments, a filter may be suspended in a liquid mixture having solid particles, a liquid removal assembly may be configurable create the inwardly-directed suction to potentiate passage of liquid in the liquid mixture through the pores of the filter and potentiate accumulation of solid particles in the liquid mixture to collect and agglomerate at an exterior surface of the filter. In some embodiments, a shockwave assembly may be configurable to remove agglomerated solid particles from an exterior surface of the filter. According to some embodiments, a system may comprise a liquid flow meter operable to measure a flow rate of liquid passing through the filter assembly. According to some embodiments, a shockwave assembly may be configurable to apply a shockwave to a filter when a liquid flow rate may be below a minimum threshold value. According to some embodiments, a system may comprise a liquid outlet section connected to a filter assembly, a liquid outlet section operable to discharge a liquid passing through a filter assembly. A liquid removal assembly may comprise a liquid suction introduced between a filter assembly and a liquid outlet section, in some embodiments. A system may comprise, in some embodiments, a container for housing the liquid mixture, wherein an inwardly-directed suction may be a pressure differential created by introducing positive pressure into a container. According to some embodiments, a liquid removal assembly may be configurable to create an inwardly-directed suction when a liquid flow rate exceeds a minimum threshold value.

According to some embodiments, a liquid removal assembly may create an inwardly-directed suction when a shockwave assembly does not apply a shockwave to the filter. In some embodiments, a filter may be a ceramic membrane. According to some embodiments, a system may comprise a controller, the controller operable to configure a liquid removal assembly to create an inwardly-directed suction; and configure a shockwave assembly to apply a shockwave. In some embodiments, a controller may be in communication with a liquid flow meter, the liquid flow meter operable to measure a flow of liquid through the filter assembly. According to some embodiments, a controller may configure a liquid removal assembly to create an inwardly-directed suction when a measured liquid flow through a filter assembly exceeds a minimum threshold value. In some embodiments, a controller configures a shockwave assembly to apply a shockwave when a measured liquid flows through a filter assembly may be below a minimum threshold value. According to some embodiments, a controller may configure a shockwave assembly to apply a shockwave when a liquid removal assembly may be configured to not create an inwardly-directed suction. In some embodiments, a system may further comprise an anchor assembly, wherein a controller may be operable to configure the anchor assembly to secure a filter of a filter assembly at a first location, the first location being a location inside a container housing a liquid mixture; and wherein the controller may be operable to configure a liquid removal assembly to create an inwardly-directed suction when the anchor assembly may be configured to secure the filter at the first location. According to some embodiments, a controller may be operable to configure an anchor assembly to move a filter of the filter assembly between a first location and a second location, the second location being a location outside of a container. In some embodiments, a controller may be operable to configure a shockwave assembly to apply a shockwave when an anchor assembly may be configured to secure a filter at the second location.

A method for dewatering liquid mixture containing solid particles may comprise, according to some embodiments, configuring a filter assembly in a dead end manner. A filter assembly may include an exposed filter and a body attached to the filter. A filter may have a plurality of pores. A method may comprise providing a liquid outlet section. A liquid outlet section may be operable to receive and discharge liquid. A method may comprise connecting a liquid removal assembly between the body of a filter assembly and a liquid outlet section. A method may further comprise configuring a liquid removal assembly. A liquid removal assembly may be configured to selectively apply an inwardly-directed suction at pores of a filter. A method may further comprise configuring a shockwave assembly. A shockwave assembly may be configured to selectively apply a shockwave to a filter.

A system may comprise, in some embodiments, a flow meter to measure a liquid flow through a filter assembly. A system may comprise providing a controller, wherein the controller may be operable to configure a liquid removal assembly to selectively apply an inwardly-directed suction, according to some embodiments. In some embodiments, a controller may be operable to communicate with a flow meter, and a controller may be configure a liquid removal assembly to selectively apply an inwardly-directed suction when a measured liquid flow exceeds a minimum threshold value. According to some embodiments, a controller may be further operable to configure a shockwave assembly to selectively apply a shockwave. In some embodiments, a controller may configure a shockwave assembly to selectively apply a shockwave when a measured liquid flow may be below a minimum threshold value.

BRIEF DESCRIPTION OF THE DRAWINGS

Some embodiments of the disclosure may be understood by referring, in part, to the present disclosure and the accompanying drawings, wherein.

DETAILED DESCRIPTION

Figure 1A:
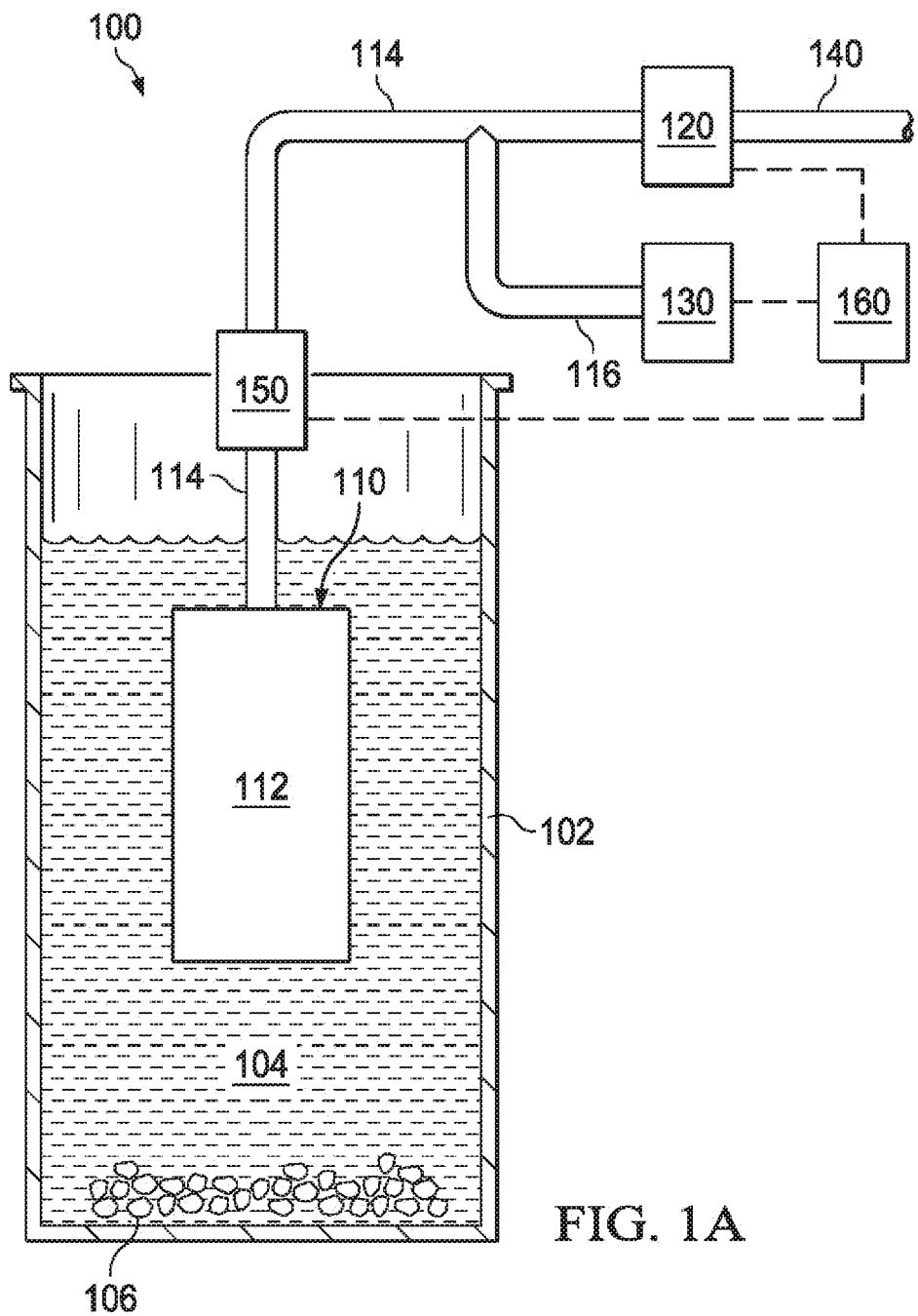
FIG. 1A illustrates a cross-sectional view of a system for use in dewatering solids and/or solid particles in a contaminated liquid mixture, according to a specific example embodiment of the disclosure.

System for Dewatering Solids and/or Solid Particles (e.g., Element 100)

FIGS. 1A-F illustrate example embodiments of a system 100 for use in, among other things, dewatering solids and/or solid particles contained in a contaminated liquid mixture. The system (e.g., element 100) may include one or more filter assemblies (e.g., element 110), one or more liquid removal assemblies (e.g., element 120), and one or more shockwave assemblies (e.g., element 130). In some embodiments, the system 100 may perform the dewatering of solids and/or solid particles using a chemical-free process. It is to be understood in the present disclosure that references to Figures and/or reference numerals in the Figures are merely references to example embodiments to which the teachings contained in the present disclosure may be practiced, and such references should not be considered or construed as limiting the teachings contained in the present disclosure to such references and/or illustrations.

Filter Assembly (e.g., Element 110)

System 100 may comprise one or more filter assemblies 110. One or more filter assemblies 110 may comprise one or more filters 112, such as a ceramic membrane 112, or the like. As illustrated in FIGS. 1A-F, one or more filter assemblies 110 may be configurable or configured in a "dead-end" manner and for use with or in a liquid mixture housed (or received or contained) in a container 102, or the like. One or more filter assemblies 110 may be configured in an outside-in arrangement such that one or more filters 112 is/are directly exposed to liquid mixture 104 when one or more filters 112 is/are submerged (or immersed or introduced or suspended) in liquid mixture 104. In operation, one or more filters 112 may be submerged in such a way that one or more filters 112 is/are suspended in the liquid mixture, resting at a bottom surface of container 102, positioned near a top portion of container 102, and/or selectively or dynamically moved based on, among other things, a quantity (such as depth) of liquid mixture 104, size or shape of container 102, etc.

Figure 1B:
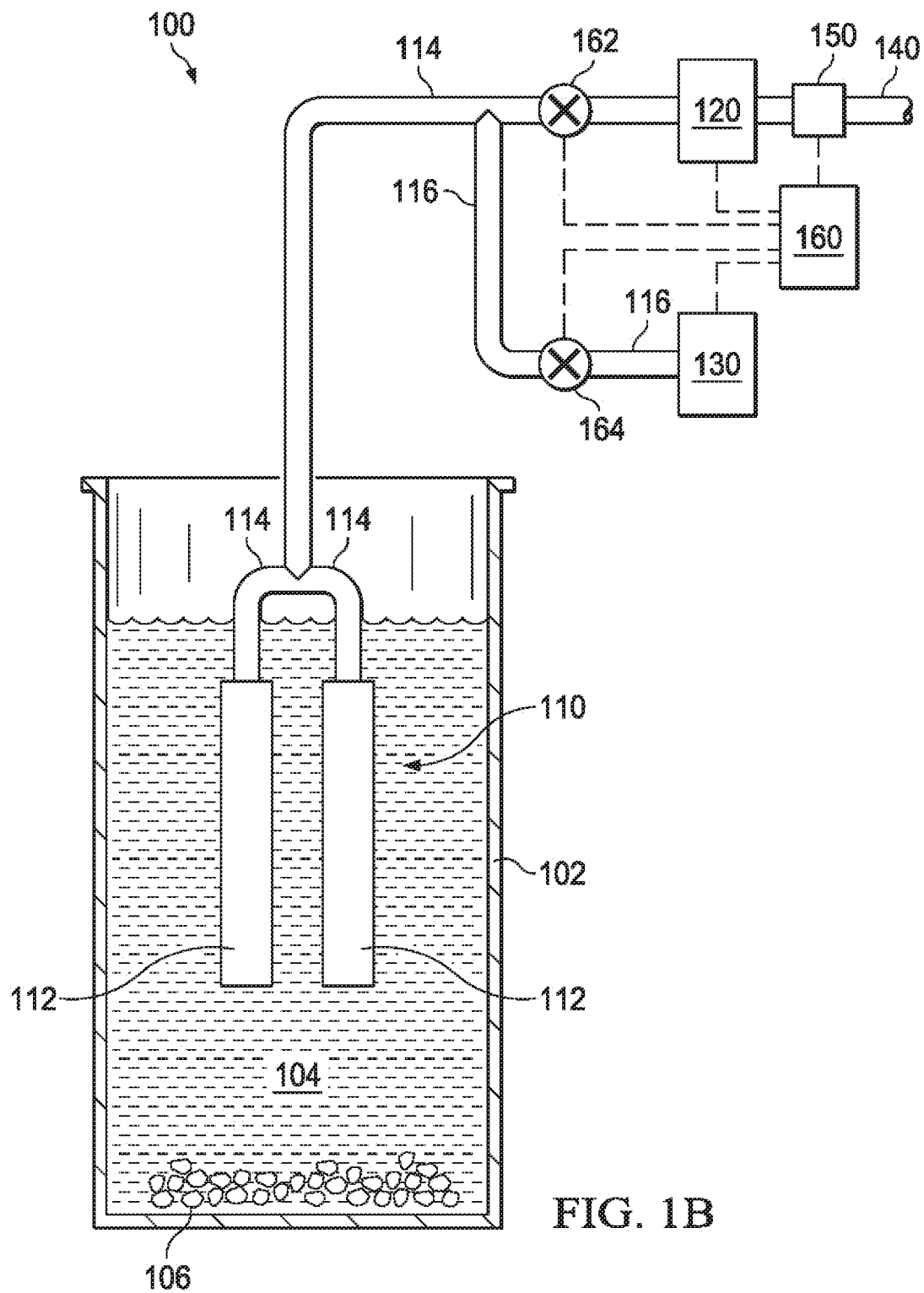
FIG. 1B illustrates a cross-sectional view of a system for dewatering solids and/or solid particles in a contaminated liquid mixture having two or more filters, according to a specific example embodiment of the disclosure.
Figure 1C:
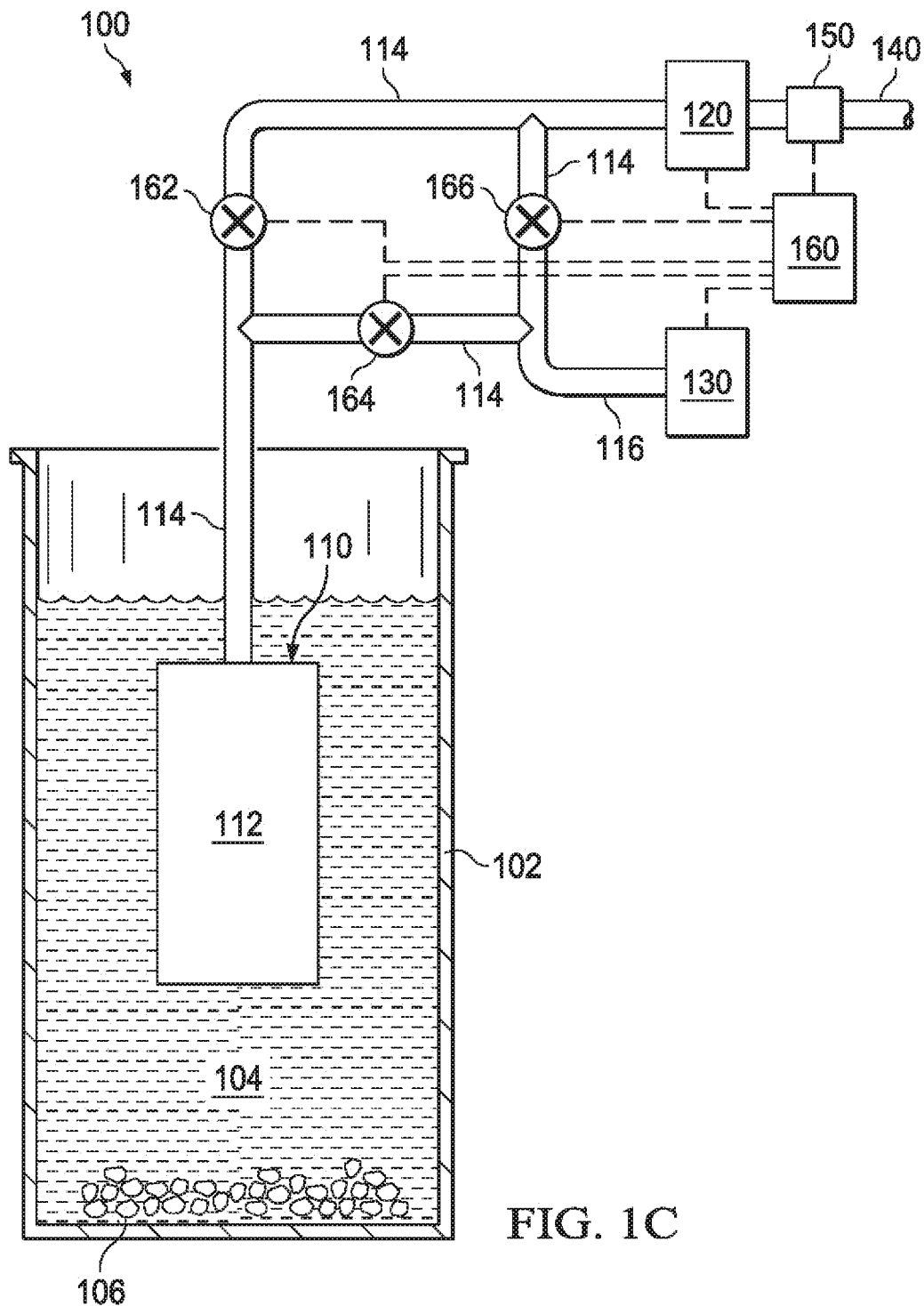
FIG. 1C illustrates a cross-sectional view of a system for dewatering solids and/or solid particles in a contaminated liquid mixture, according to a specific example embodiment of the disclosure.
Figure 1D:
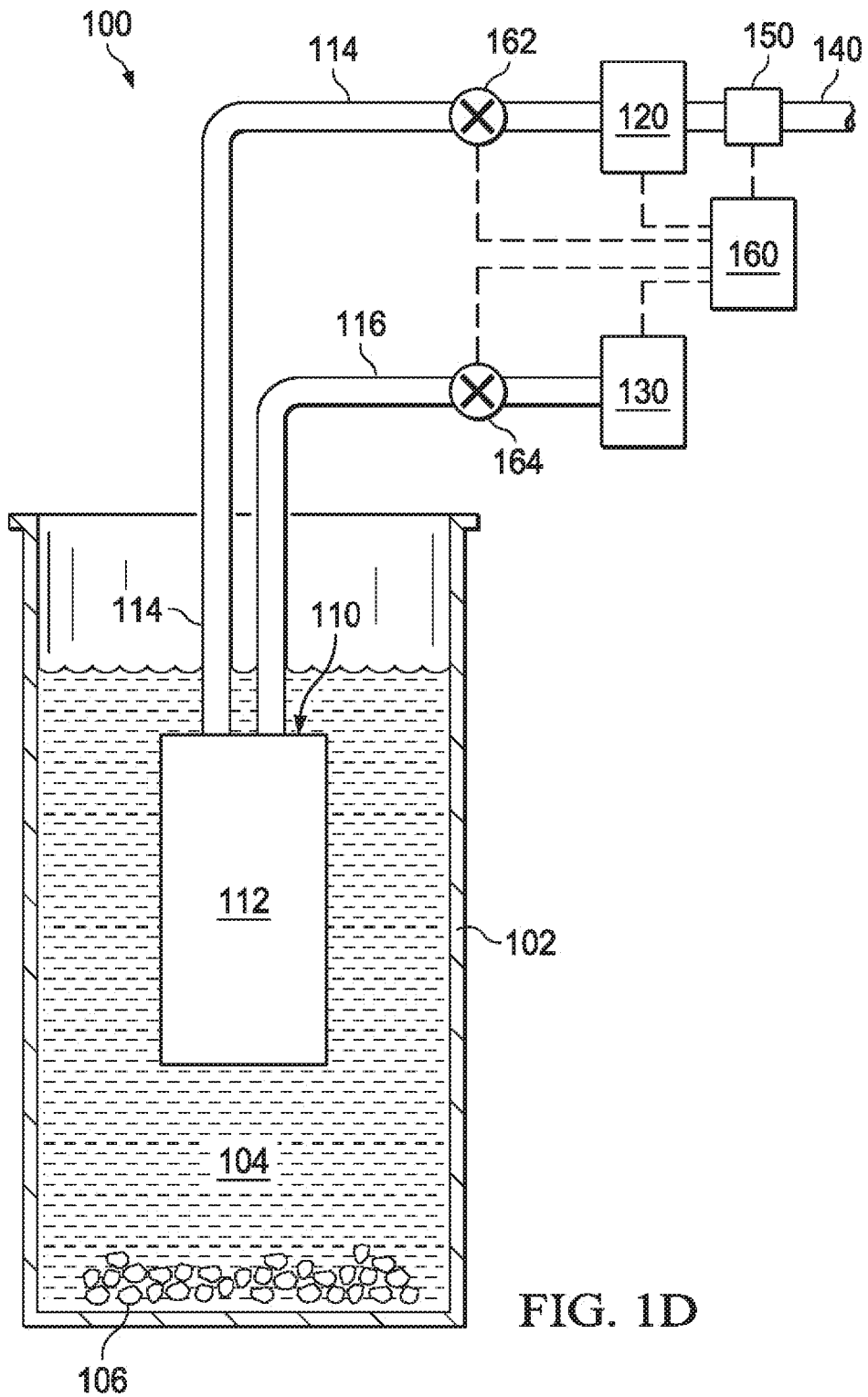
FIG. 1D illustrates a cross-sectional view of a system for dewatering solids and/or solid particles in a contaminated liquid mixture, according to a specific example embodiment of the disclosure.
Figure 1E:
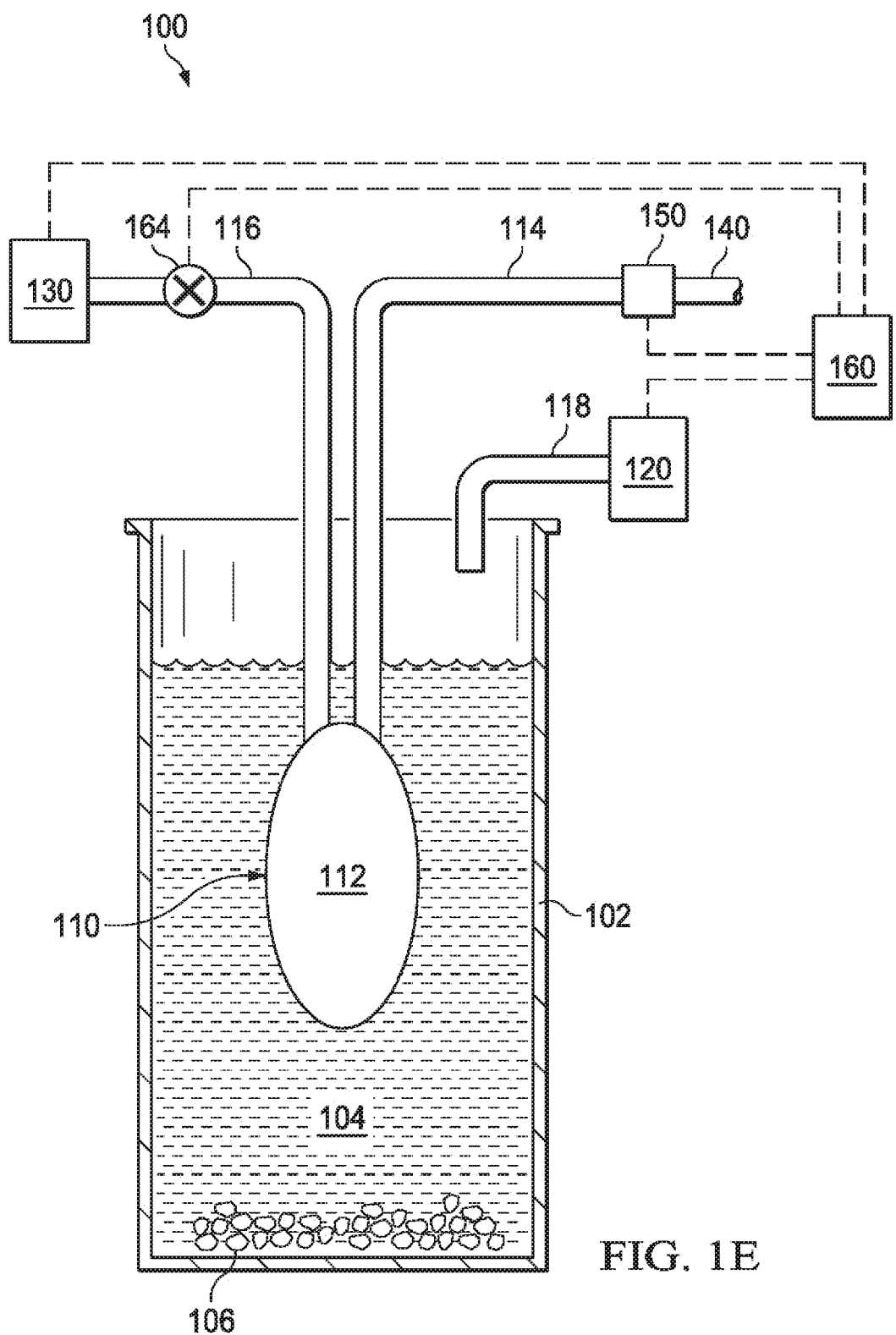
FIG. 1E illustrates a cross-sectional view of a system for dewatering solids and/or solid particles in a contaminated liquid mixture, according to a specific example embodiment of the disclosure.
Figure 1F:
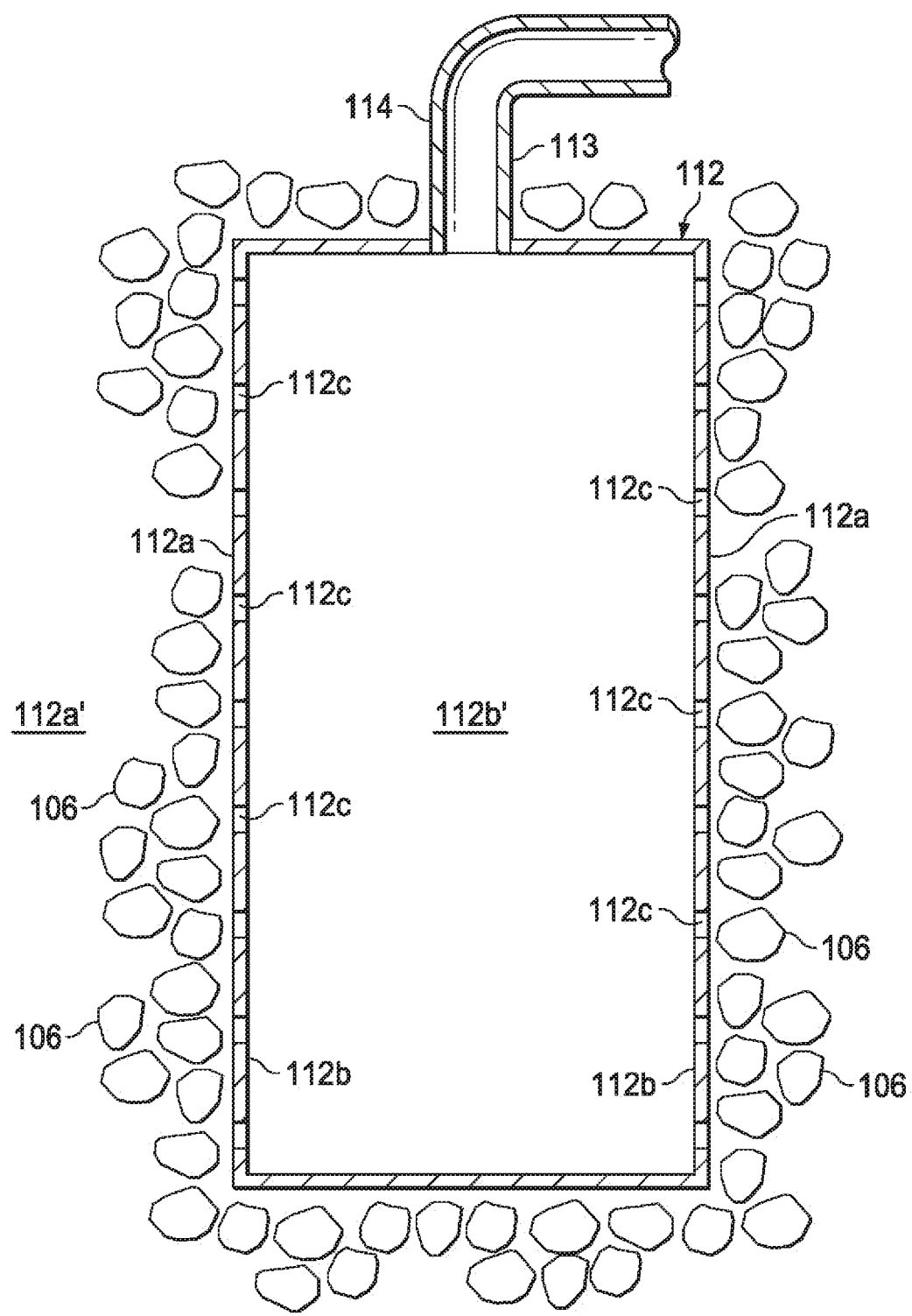
FIG. 1F illustrates a cross-sectional view of a system for dewatering solids and/or solid particles in a contaminated liquid mixture, according to a specific example embodiment of the disclosure.

As illustrated in the cross-sectional illustration of FIG. 1F, one or more filters 112 of one or more filter assemblies 110 may include an outwardly facing exterior surface 112a and an inwardly facing interior surface 112b opposite to the exterior surface. The inwardly facing interior surface 112b may be considered as facing outlet section 140 in example embodiments.

One or more filters 112 may include a plurality of pores 112c, or the like. Pores 112c may be operable to allow liquid to pass through filter 112 (such as from an area 112a' near outwardly facing exterior surface 112a to an area 112b' near inwardly facing interior surface 112b). Pores 112c of one or more filters 112 may be further operable to prevent one or more solid particles 106 from passing through filter 112. In example embodiments, such solid particles 106 may collect and agglomerate (or flocculate) to form larger-sized solid particles (or macro particles) at outwardly facing exterior surface 112a of one or more filters 112 when liquid in liquid mixture 104 passes through filter 112. Such encouraging will be further discussed in sections "Liquid removal assembly (e.g., element 120)" and "Methods for dewatering solids and/or solid particles (e.g., method 300)," and herein.

Pores 112c may be of any shape, size, dimension, quantity, and/or separation spacing in example embodiments. The sizes (and/or shapes and/or quantities and/or spacing) of pores 112c (i.e., filter 112) may be selected based on, among other things, a known or expected size (which can be a minimum, average, mean, etc. value), dimension, quantity, density, and/or shape of solid particles 106 contained in liquid mixture 104. For example, diameters of pores 112c may be about 0.05 to 1 microns.

Filter 112 may be formed in any shape and/or quantity. For example, one or more filters 112 may be a substantially flat rectangular shaped filter 112, as illustrated in FIGS. 1A, 1C, and 1E. One or more filters 112 may also be a substantially cylindrical, as illustrated in FIG. 1B. One or more filters 112 may also be a substantially circular shaped, as illustrated in FIG. 1E. One or more filters 112 may also be formed in other 2-dimensional and/or 3-dimensional shapes, including, but not limited to, square or cubical shapes, oval shapes, hexagonal shapes, combination of shapes, other geometrical shapes, irregular shapes, etc. Two or more filters 112 may be provided for filter assembly 110, as illustrated in FIG. 1B.

Filter 112 may have any shape, dimension (e.g., porosity), and/or size desired. Selection of the shape, dimension, and/or size of filter 112 may be based on one or more considerations, including, but not limited to, the amount (or depth, volume, concentration, etc.) of liquid mixture 104 being treated, the amount of solid particles 106 in liquid mixture 104, and/or size, shape, and/or dimension of container 102 used to receive and house liquid mixture 104. Example shapes of container 102 may include, but are not limited to, cylindrical shaped containers 102, cubical shaped containers 102, rectangular shaped containers 102, spherical shaped containers 102, etc. Example dimensions of filter 112 may include, but are not limited to, a length of about 14.3 cm, a width of about 24 to 48 cm, and a depth of about 6 mm. According to some embodiments, solid particles 106 in liquid mixture 104 may agglomerate (or flocculate) to form larger sized solid particles (or macro particles) at inwardly facing interior surface of container 102. Solid particles 106 that have agglomerated to form larger sized particles on an inwardly facing interior surface of container 102 may be removed by various means. Means for removing may comprise dumping, pouring, scraping, lifting, extracting, prying, sloughing, and combinations thereof.

Filter 112 may be formed of any desired material. Example material compositions include, but are not limited to, ceramic (SiC, Alumina), titania, and polymeric. In some embodiments, ceramic may be preferred for its ability to handle shockwaves provided by a shockwave assembly (e.g., shockwave assembly 130).

One or more filter assemblies 110 may be in communication with (i.e., connected or attached, directly or indirectly, to) one or more outlet sections 140 via one or more pipes, tubes, channels, or the like 114 (hereinafter "pipe"), as illustrated in FIGS. 1A-F. Pipes (e.g., pipes 114) may have any desired size. For example, size may be selected based on one or more of considerations, including, but not limited to, an amount of liquid mixture 104 received in container 102, desired processing time, desired liquid flow to the outlet section 140, characteristics of filter 112, etc. Example diameters of the pipes 114 may be between about 0.25 to 1 cm. In example embodiments, one or more filter assemblies 110 may be connected, directly or indirectly, to one or more outlet sections 140 via one or more liquid removal assemblies 120, as illustrated in FIGS. 1A-D. Liquid removal assembly 120 will be further discussed in the sections "Liquid removal assembly (e.g., element 120)" and "Methods for dewatering solids and/or solid particles (e.g., method 300)," and herein. In example embodiments, one or more filter assemblies 110 may be connected, directly or indirectly, to one or more outlet sections 140 via one or more valves 162, as illustrated in FIGS. 1B-D. The valves 162 may be any quantity or type of valve known in the art including, but not limited to, a control valve, gate valve, ball valve, etc. In example embodiments, one or more filter assemblies 110 may be connected, directly or indirectly, to one or more outlet sections 140 via one or more liquid flow meters 150, as illustrated in FIGS. 1A-E.

One or more filter assemblies 110 may be configurable to communicate with (i.e., connect or attach, directly or indirectly, to) one or more shockwave assemblies 130 via one or more pipes, tubes, channels, or the like 114 and/or 116, as illustrated in FIGS. 1A-F. Specifically, one or more filters 112 may be connected, directly or indirectly, to one or more shockwave assemblies 130, and such connection may be via one or more valves 164. The valves 164 may be any quantity or type of valve known in the art including, but not limited to, a control valve, gate valve, ball valve, etc.

Liquid Removal Assembly (e.g., Element 120)

According to some embodiments, system 100 may comprise a liquid removal assembly 120. Liquid removal assembly 120 may be configurable to create (or introduce or apply), among other things, a pressure differential (such as a negative pressure and/or suction force), or the like. Such pressure differential may be created in one or more of a plurality of ways, such as by creating a pressure reduction (or negative pressure or suction force) between or in an area between filter assembly 110 and the outlet section 140. Liquid removal assembly 120 may be configurable to create an inwardly-directed suction (or vacuum or suction force) at, in, and/or around the pores 112c of one or more filters 112, as well as in areas 112a' and 112b' and pipes 114 and 116, in example embodiments. As used in the present disclosure, an inwardly-directed suction at the pores 112c may be a suction force directed towards outlet section 140, and more specifically, from area 112a' towards area 112b' (and towards outlet section 140), as illustrated in FIG. 1F.

In operation, when one or more filters 112 is/are suspended in a liquid mixture 104, as illustrated in FIGS. 1A-F, liquid removal assembly 120 may be configurable to potentiate passage of liquid in liquid mixture 104 through one or more filters 112 (i.e., via pores 112c). Liquid removal assembly 120 may also be configurable to potentiate collection, deposition, agglomeration, and/or flocculation of solid particles 106 in liquid mixture 104 at one or more filters 112 (i.e., at outwardly facing exterior surface 112a of one or more filters 112). That is, liquid removal assembly 120 may be configurable to agglomerate (or flocculate), at one or more filters 112, solid particles in liquid mixture 104, and such agglomerating (or flocculating) may be performed by, among other things, encouraging or potentiating passage of liquid in liquid mixture 104 through one or more filters 112, applying the differential pressure, and/or applying the inwardly-directed suction. In example embodiments, liquid removal assembly 120 may be a pump, vacuum, compressor, or the like.

According to some embodiments, a liquid removal assembly may be configured to modify the vacuum strength. Modifying vacuum strength may allow, in some embodiments, the thickness, consistency, or another aspect of the cake to be pre-selected and/or adjusted during operation. In some embodiments, a higher vacuum strength may produce a thicker cake. A lower vacuum strength, according to some embodiments, may produce a thinner cake. According to some embodiments, a higher vacuum strength may produce a dryer cake. A higher vacuum strength may also produce a more compact cake, according to some embodiments. A lower vacuum strength, in some embodiments, may produce a wetter cake. A lower vacuum strength, may produce a more voluminous cake, according to some embodiments.

Liquid removal assembly 120 may also create a pressure differential between the interior of container 102 and an area between one or more filter assemblies 110 and the outlet section 140 by configuring liquid removal assembly 120 to introduce a positive pressure into container 102, as illustrated in FIG. 1E. In example embodiments, container 102 may be substantially sealed, such as in an airtight manner (or hermetically sealed), and the positive pressure may be operable to potentiate passage of liquid in liquid mixture 104 through one or more filters 112 (i.e, via pores 112c) and solid particles 106 in liquid mixture 104 to collect and agglomerate (or flocculate) at one or more filters 112 (i.e., at outwardly facing exterior surface 112a of one or more filters 112).

In example embodiments, liquid removal assembly 120 may create and/or maintain a pressure differential, inwardly-directed suction, potentiate passage of liquid through one or more filters 112, and/or potentiate accumulation of solid particles 106 to collect and agglomerate (or flocculate) at one or more filters 112 based on, among other things, a consideration of a measured flow rate of liquid passing through one or more filters 112, one or more filter assemblies 110, liquid removal section 120, and/or outlet section 140. The measured flow rate may be a real-time measure, average or mean value measure, minimum (or maximum) value measure, etc., in example embodiments. For example, liquid removal assembly 120 may continue to perform the pressure differential, inwardly-directed suction, encouraging or potentiating passage of liquid, and agglomerating (or flocculating) of solid particles 106 when one or more flow meters 150 measures a real-time or minimum liquid flow rate to at least exceed a minimum threshold value. In some embodiments, the minimum threshold value may be about 0 gallons per minute. In some embodiments, liquid removal assembly 120 may create and/or maintain a pressure differential, inwardly-directed suction, potentiate passage of liquid through one or more filters 112, and potentiate accumulation of solid particles 106 to collect and agglomerate (or flocculate) at one or more filters 112 based on, among other things, other metrics including pressure, pressure drop, weight, mass, flow, time, etc.

It is recognized in the present disclosure that, as liquid removal assembly 120 continues to perform the pressure differential, inwardly-directed suction, and/or encouraging or potentiating passage of liquid through one or more filters 112, solid particles 106 in liquid mixture 104 may continue to collect and agglomerate (or flocculate) at one or more filters 112. In this regard, the flow rate of liquid passing through one or more filters 112, one or more filter assemblies 110, liquid removal section 120, and/or outlet section 140 may reduce accordingly. In example embodiments, liquid removal assembly 120 may be configurable to continue performing the pressure differential, inwardly-directed suction, encouraging or potentiating passage of liquid, and agglomerating (or flocculating) of solid particles 106, and may stop doing so when the liquid flow rate reaches or drops below the minimum threshold value. In example embodiments, liquid removal assembly 120 may be configurable to selectively or dynamically adjust (e.g., increase) the pressure differential, inwardly-directed suction, and/or encouraging or potentiating passage of liquid as the flow rate of liquid reduces (or is reduced) based on the measured liquid flow rate so as to attempt to boost or maintain the liquid flow rate at a desired value or above a minimum threshold value.

In example embodiments, liquid removal assembly 120 may perform the pressure differential, inwardly-directed suction, encouraging or potentiating passage of liquid through one or more filters 112, and/or potentiating accumulation of solid particles 106 to collect and agglomerate (or flocculate) at one or more filters 112 based on, among other things, a consideration of solid particles 106 agglomerated (or flocculated) at one or more filters 112 (i.e., outwardly facing exterior surface 112a of one or more filters 112). The consideration of solid particles 106 agglomerated (or flocculated) at one or more filters 112 may be a real-time consideration, average or mean consideration, minimum (or maximum) consideration, etc., in example embodiments. For example, liquid removal assembly 120 may continue to perform the pressure differential, inwardly-directed suction, encouraging or potentiating passage of liquid, and/or agglomerating (or flocculating) of solid particles 106 until a thickness (average, mean, maximum, etc.) of solid particles 106 agglomerated (or flocculated) at one or more filters 112 reaches a certain maximum threshold value. Examples of the maximum threshold value may be about 0.5 to 10 mm. As another example, liquid removal assembly 120 may perform the pressure differential, inwardly-directed suction, encouraging or potentiating passage of liquid, and/or agglomerating (or flocculating) of solid particles 106 until a layer of solid particles 106 agglomerated (or flocculated) at one or more filters 112 reaches a certain consistency. Considerations of solid particles 106 agglomerated (or flocculated) at one or more filters 112 may be performed in any desired manner. For example, assessment may include visual inspection, measured liquid flow rate, pressure, pressure differential, weight, mass, flow, time, etc.

Liquid removal assembly 120 may perform the pressure differential, inwardly-directed suction, encouraging or potentiating passage of liquid through one or more filters 112, and/or potentiating accumulation of solid particles 106 to collect and agglomerate (or flocculate) at one or more filters 112 when shockwave assembly 130 is configured to not remove the agglomerated (or flocculated) solid particles 106 from one or more filters 112. In example embodiments, liquid removal assembly 120 performs said pressure differential, inwardly-directed suction, encouraging or potentiating passage of liquid through one or more filters 112, and/or potentiating accumulation of solid particles 106 to collect and agglomerate (or flocculate) at one or more filters 112 on a periodic, intermittent, scheduled, or random basis, or based on visual inspections.

Shockwave Assembly (e.g., Element 130)

In some embodiments, system 100 may comprise a shockwave assembly 130. Shockwave assembly 130 may be configurable to create (and/or introduce, apply, etc.), among other things, a shockwave (or dynamic shock), or the like, and such shockwave may be applied to one or more filters 112 and/or one or more filter assemblies 110. Shockwave assembly 130 may create (and/or introduce, apply, etc.) the shockwave in one or more of a plurality of ways known in the art. In some embodiments, the shockwave may be applied to a vertically-oriented or substantially vertically-oriented filter 112 and/or filter assembly 110. A vertical orientation may facilitate or permit dewatered solids to separate from and/or fall off a filter (e.g., filter 112).

In operation, when one or more filters 112 is/are suspended in a liquid mixture 104 and solid particles 106 have collected and agglomerated (or flocculated) at one or more filters 112 (i.e., at outwardly facing exterior surface 112a of one or more filters 112), as illustrated in FIG. 1F, shockwave assembly 130 may be configurable to apply the shockwave to one or more filters 112 so as to cause the collected and agglomerated (or flocculated) solid particles 106 to be removed from one or more filters 112. In an example embodiment, shockwave assembly 130 may be operable to receive an applied pressure to generate the shockwave and control a duration of the applied shockwave. Shockwave assembly 130 may be operable to control a magnitude of the shockwave applied to one or more filters 112 and/or one or more filter assemblies 110 in example embodiments. For example, shockwave assembly 130 may be configurable to apply a low energy shockwave, a high energy shockwave, a variation of or between low and high energy shockwaves, etc.

According to some embodiments, a shockwave assembly may be configurable to modify frequency of shockwave pulses. In some embodiments, a shockwave assembly may be configured to modify a pressure applied by a shockwave pulse. Modifying shockwave frequency and/or pressure may allow, in some embodiments, the thickness, consistency, or another aspect of the cake to be pre-selected and/or adjusted during operation. In some embodiments, a higher frequency of shockwave pulses may produce a thinner cake. A lower frequency shockwave pulses may produce a thicker cake, according to some embodiments. According to some embodiments, a lower pressure shockwave may produce a thicker cake. A high pressure shockwave may produce a thinner cake, in some embodiments. In some embodiments, a greater frequency of shockwave pulses and/or a greater shockwave pulse pressure may produce a thinner cake. According to some embodiments, a lower frequency of shockwave pulses and/or a lower shockwave pulse pressure may produce a thicker cake. In some embodiments, a shockwave pulse pressure may be selected to avoid overly stressing or damaging a plate filter (e.g., a flat plate filter).

In example embodiments, shockwave assembly 130 may be configurable to apply a shockwave to one or more filters 112 based on, among other things, a consideration of a measured flow rate of liquid passing through one or more filters 112, one or more filter assemblies 110, liquid removal section 120, and/or outlet section 140. The measured flow rate may be a real-time measure, average or mean value measure, minimum (or maximum) value measure, etc., in example embodiments. For example, shockwave assembly 130 may apply the shockwave to one or more filters 112 when one or more flow meters 150 measures a real-time or minimum liquid flow rate to be below a minimum threshold value. In an example embodiment, the minimum threshold value may be about 0 gallons per minute.

It is recognized in the present disclosure that, as liquid removal assembly 120 continues to perform the pressure differential, inwardly-directed suction, and/or encouraging or potentiating passage of liquid through one or more filters 112, solid particles 106 in liquid mixture 104 may continue to collect and agglomerate (or flocculate) at one or more filters 112 and the flow rate of liquid passing through one or more filters 112, one or more filter assemblies 110, liquid removal section 120, and/or outlet section 140 may reduce accordingly. In example embodiments, shockwave assembly 130 may be configurable to selectively or dynamically apply the shockwave to one or more filters 112 to remove solid particles 106 collected and agglomerated (or flocculated) at one or more filters 112 and enable liquid removal assembly 120 to continue performing the pressure differential, inwardly-directed suction, and/or encouraging of liquid to pass through one or more filters 112.

In example embodiments, shockwave assembly 130 may be configurable to selectively or dynamically apply the shockwave to one or more filters 112 based on, among other things, a consideration of solid particles 106 agglomerated (or flocculated) at one or more filters 112 (i.e., outwardly facing exterior surface 112a of one or more filters 112). The consideration of solid particles 106 agglomerated (or flocculated) at one or more filters 112 may be a real-time consideration, average or mean consideration, minimum (or maximum) consideration, etc., in example embodiments. For example, shockwave assembly 130 may selectively apply the shockwave to one or more filters 112 when a thickness (average, mean, maximum, etc.) of solid particles 106 agglomerated (or flocculated) at one or more filters 112 reaches a certain maximum threshold value. Examples of the maximum threshold value may be about 0.5 to 10 mm. As another example, shockwave assembly 130 may selectively apply the shockwave to one or more filters 112 when a layer of solid particles 106 agglomerated (or flocculated) at one or more filters 112 reaches a certain consistency. Considerations of solid particles 106 agglomerated (or flocculated) at one or more filters 112 may be performed in one or more of a plurality of other ways, including, but not limited to, visual inspection, measured liquid flow rate, other metrics including pressure, pressure drop, weight, mass, flow, time, etc.

Shockwave assembly 130 may also be configured to selectively or dynamically apply a shockwave to one or more filters 112 when liquid removal assembly 120 is configured to not perform the pressure differential, inwardly-directed suction, encouraging or potentiating passage of liquid through one or more filters 112, and/or potentiating accumulation of solid particles 106 to collect and agglomerate (or flocculate) at one or more filters 112. In example embodiments, shockwave assembly 130 may also be configured to selectively or dynamically apply the shockwave to one or more filters 112 when one or more filters 112 is/are not suspended in liquid mixture 104, such as when one or more filters 112 is/are removed from liquid mixture 104 and/or container 102, liquid mixture 104 in container 202 is substantially removed, etc.

In example embodiments, shockwave assembly 130 may be configured to selectively or dynamically apply the shockwave to one or more filters 112 on a periodic, intermittent, scheduled, or random basis, or based on visual inspections.

Controller (e.g., Element 160)

System 100 may comprise, in some embodiments, controller 160. Controller 160 may be any device operable to communicate with one or more elements of system 100, and may include a, including a computing device, communication device, virtual machine, computer, node, instance, host, or machine in a networked computing environment.

Controller 160 may comprise logic stored in non-transitory computer readable medium which, when executed by controller 160 and/or a processor of or associated with controller 160, is operable to perform one or more operations, configuring actions, and/or communications with one or more elements of system 200, as described in the present disclosure. For example, controller 160 may be operable to communicate with and/or configure one or more of filter assembly 110, liquid removal assembly 120, shockwave assembly 130, outlet section 140, flow meter 150, valve 162, valve 164, valve 166, and/or anchor assembly 200.

In some embodiments, controller 160 may be operable to control the passing of liquid through one or more filters 112, one or more filter assemblies 110, one or more pipes 114 and 116, one or more liquid removal assemblies 120, one or more flow meters 150, and/or one or more outlet sections 140, as well as control the collecting and agglomerating (or flocculating) of solid particles 106 on one or more filters 112. For example, controller 160 may be operable to configure liquid removal assembly 120 to perform the pressure differential, inwardly-directed suction, encouraging or potentiating passage of liquid through one or more filters 112, and/or potentiating accumulation of solid particles 106 to collect and agglomerate (or flocculate) at one or more filters 112, as described above and in the present disclosure. In this regard, controller 160 may communicate with, among other things, flow meter 150 to obtain a measured flow rate of liquid passing through one or more filters 112, one or more filter assemblies 110, liquid removal section 120, and/or outlet section 140, and controller 160 may start, stop, or adjust the performance of liquid removal assembly 120 accordingly. Controller 160 may also communicate with shockwave assembly 130 to determine whether or not a shockwave is being applied to one or more filters 112, and controller 160 may start, stop, or adjust the performance of liquid removal assembly 120 accordingly. Controller 160 may also communicate with one or more valves 162, 164, and/or 166 to ensure shockwave assembly 130 does not apply a shockwave when liquid removal assembly 120 is in operation (if needed). Controller 160 may also communicate with anchor assembly 200 to determine whether one or more filters 112 is/are in the first location, second location, or other location, or whether one or more filters 112 is/are being selectively or dynamically moved and/or secured at other locations within container 102, and controller 160 may start, stop, or adjust the performance of liquid removal assembly 120 accordingly.

Controller 160 may be operable to control, according to some embodiments, the removal of solid particles 106 collected and agglomerated (or flocculated) on one or more filters 112. For example, controller 160 may be operable to configure shockwave assembly 130 to apply a shockwave to one or more filters 112, as described above and in the present disclosure. In this regard, controller 160 may communicate with, among other things, flow meter 150 to obtain a measured flow rate of liquid passing through one or more filters 112, one or more filter assemblies 110, liquid removal section 120, and/or outlet section 140, and controller 160 may start, stop, or adjust (such as increase or decrease the magnitude of the applied shockwave) the performance of shockwave assembly 130 accordingly. Controller 160 may also communicate with liquid removal assembly 120 to determine whether or not liquid removal assembly 120 is performing the pressure differential, inwardly-directed suction, encouraging or potentiating passage of liquid through one or more filters 112, and/or potentiating accumulation of solid particles 106 to collect and agglomerate (or flocculate) at one or more filters 112, and controller 160 may start, stop, or adjust the performance of liquid removal assembly 120 accordingly. Controller 160 may also communicate with one or more valves 162, 164, and/or 166 to ensure liquid removal assembly 120 is not performing the pressure differential, inwardly-directed suction, and/or encouraging of liquid to pass through one or more filters 112 and solid particles 106 to collect and agglomerate (or flocculate) at one or more filters 112 when shockwave assembly 130 is in operation (if needed). Controller 160 may also communicate with anchor assembly 200 to determine whether one or more filters 112 is/are in the first location, second location, or other location, or whether one or more filters 112 is/are being selectively or dynamically moved and/or secured at other locations within container 102, and controller 160 may start, stop, or adjust the performance of shockwave assembly 130 accordingly.

In some embodiments, controller 160 may be operable to control the moving and/or securing of one or more filters 112 at or between the first location, the second location, and/or other locations, and/or the selective or dynamic moving and/or securing of one or more filters 112 in other locations within container 102, as described above and in the present disclosure. For example, controller 160 may be operable to configure anchor assembly 200 to secure one or more filters 112 at a first location. Controller 160 may also be operable to configure anchor assembly 200 to secure one or more filters 112 at a second location. Controller 160 may also be operable to configure anchor assembly 200 to move one or more filters 112 between a first location and a second location. Controller 160 may also be operable to configure anchor assembly 200 to secure one or more filters 112 at other locations. For example, controller 160 may be operable to configure anchor assembly 200 to selectively or dynamically move and/or secure one or more filters 112 in other locations within container 102.

Controller 160 may be operable to control, according to some embodiments, liquid removal assembly 120 to continue to perform the pressure differential, inwardly-directed suction, encouraging or potentiating passage of liquid through one or more filters 112, and/or potentiating accumulation of solid particles 106 to collect and agglomerate (or flocculate) at one or more filters 112 when one or more filters 112 and/or one or more filter assemblies 110 is/are at a location (such as the second location) outside of container 102 and/or other location in respect of which one or more filters 112 is/are not suspended in liquid mixture 104. In doing so, liquid from the pores 112c of one or more filters 112 may be further removed, the formed cake or wet cake (i.e., agglomerated or flocculated solid particles at one or more filters 112) may be further dried, and the shockwave applied by shockwave assembly 130 may be provided through air (or more air rather than through liquid or more liquid). The controller 160 may be operable, according to some embodiments, to reduce the distance that the shockwave applied by the shockwave assembly 130 needs to travel from the shockwave assembly 130 to one or more filters 112. For example, the controller 160 may be operable, according to some embodiments, to cause the shockwave assembly 130 to be closer to one or more filters 112 and/or cause a pipe 114 and/or 116 to be shortened between the shockwave assembly 130 and one or more filters 112.

Anchor Assembly (e.g., Element 200)

Figure 2A:
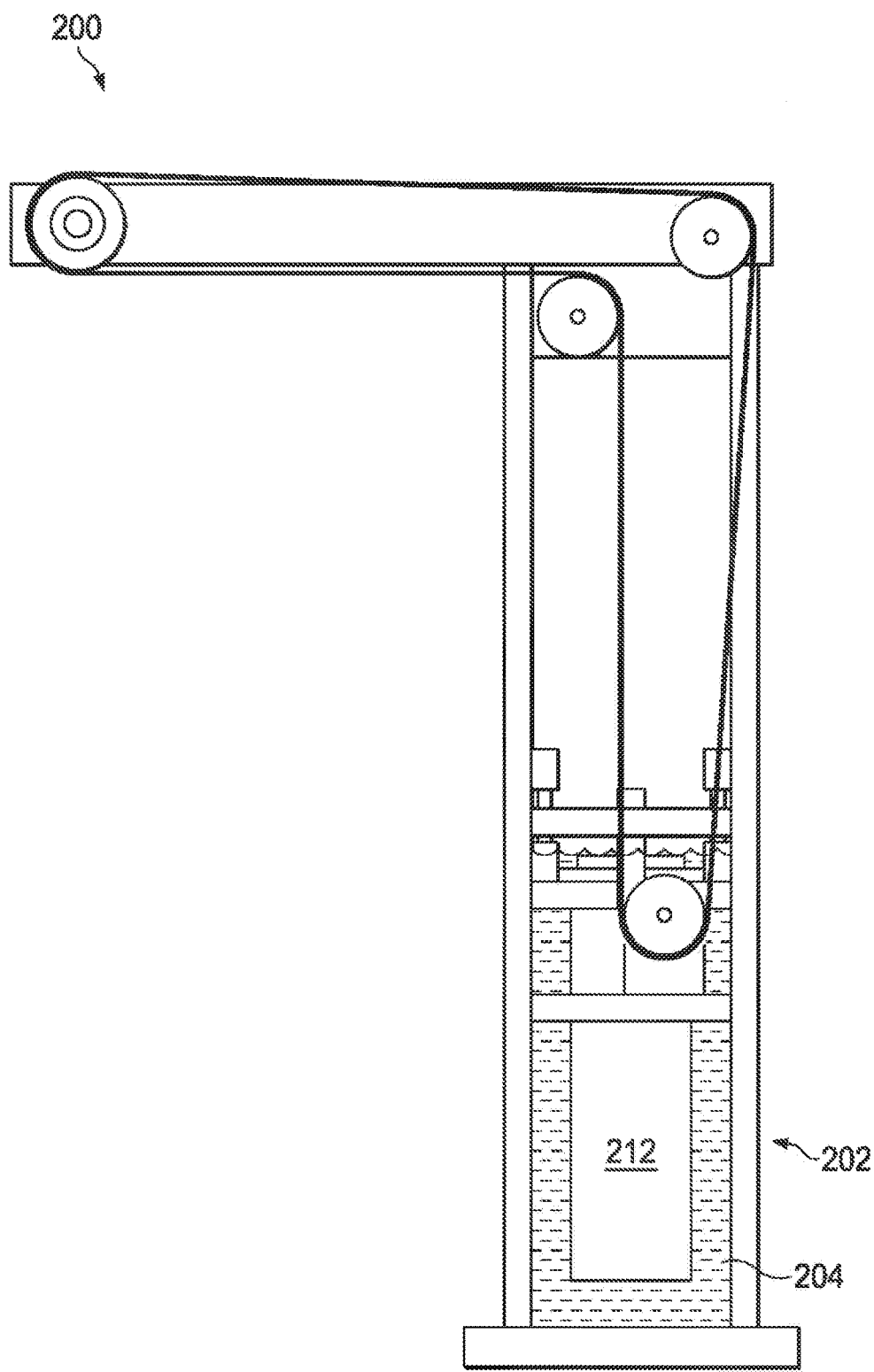
FIG. 2A illustrates a cross-sectional view of a system for dewatering solids and/or solid particles in a contaminated liquid mixture having an anchoring assembly and a filter in a first position, according to a specific example embodiment of the disclosure.
Figure 2B:
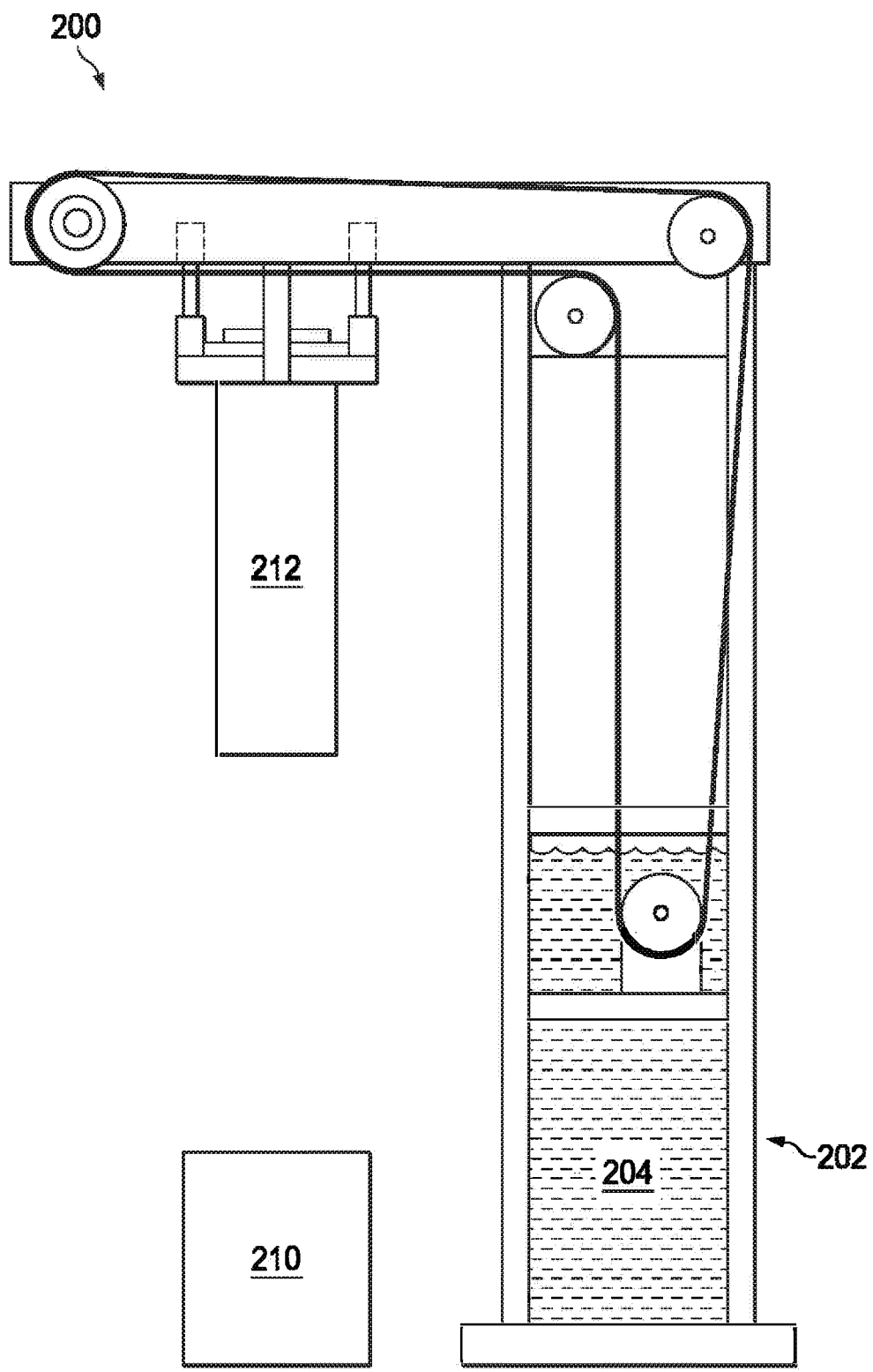
FIG. 2B illustrates a cross-sectional view of a system for dewatering solids and/or solid particles in a contaminated liquid mixture having an anchoring assembly and a filter in a second position, according to a specific example embodiment of the disclosure.

FIGS. 2A and 2B illustrate an example embodiment of a system comprising an anchor assembly 200. In an example embodiment, anchor assembly 200 may be operable to secure to one or more filters 212, one or more filter assemblies 210, container 202, and/or a secure base. In operation, anchor assembly 200 may be configurable to secure one or more filters 212 to be fixedly positioned at a first location (or position), as illustrated in FIG. 2A. The first location may be a location inside container 202 and/or a location in respect of which one or more filters 212 is/are suspended in liquid mixture 204 when container 202 receives and houses liquid mixture 204. Anchor assembly 200 may be further configurable to secure one or more filters 212 to be fixedly positioned at a second location (or position), as illustrated in FIG. 2B. The second location may be a location outside of container 202 and/or a location in respect of which one or more filters 212 is/are not suspended in liquid mixture 204 when container 202 receives and houses liquid mixture 204. Anchor assembly 200 may be further configurable to move one or more filters 212 between the first location and the second location. Anchor assembly 200 may be further configurable to selectively or dynamically move and/or secure one or more filters 212 to be fixedly positioned at other locations, such as locations within container 202. Such selective or dynamic moving and/or securing may be based on, among other things, a quantity (such as depth) of liquid mixture 204 in container 202, shape or size of container 202, measured liquid flow rate, amount of solid particles 206 collected and agglomerated (or flocculated) on one or more filters 212, location on one or more filters 212 where solid particles 206 have collected and agglomerated (or flocculated), etc.

In operation, liquid removal assembly may be configured to perform the pressure differential, inwardly-directed suction, encouraging or potentiating passage of liquid through one or more filters 212, and/or encouraging or potentiating accumulation of solid particles 206 to collect and agglomerate (or flocculate) at one or more filters 212 when anchor assembly 200 secures one or more filters 12 at the first location. Furthermore, shockwave assembly (e.g., 120) may be configured to selectively apply the shockwave to one or more filters (e.g., 112, 212) when anchor assembly 200 secures one or more filters (e.g., 112, 212) at the first location, such as in situations wherein the agglomerated (or flocculated) solid particles (e.g., 106) are desired to be provided at the bottom of container (e.g., 102, 202), as illustrated in FIGS. 1A-E and FIGS. 2A-B. Shockwave assembly 120 may also be selectively configured to not apply the shockwave to one or more filters 212 when anchor assembly 200 secures one or more filters 212 at the first location, such as in situations wherein the agglomerated (or flocculated) solid particles 206 are desired to be removed and provided in a separate container 210 or location, as illustrated in FIG. 2B.

In respect to the second position, liquid removal assembly may be configured to briefly perform the pressure differential, inwardly-directed suction, encouraging or potentiating passage of liquid through filter 212, and/or potentiating accumulation of solid particles 206 to collect and agglomerate (or flocculate) at one or more filters 212 when anchor assembly 200 secures one or more filters 212 at the second location, such as in situations wherein a dampness of or water surrounding the agglomerated (or flocculated) solid particles 206 collected at one or more filters 212 are desired to be reduced before shockwave assembly 230 applies the shockwave to one or more filters 212. Liquid removal assembly may also be selectively configured to not perform the pressure differential, inwardly-directed suction, encouraging or potentiating passage of liquid through filter 212, and/or potentiating accumulation of solid particles 206 to collect and agglomerate (or flocculate) at one or more filters 212 when anchor assembly 200 secures one or more filters 212 at the second location, such as in situations wherein the agglomerated (or flocculated) solid particles 206 collected at one or more filters 212 are desired to be removed and provided in a separate container 210 or location, as illustrated in FIG. 2B. Shockwave assembly may also be selectively configured to apply the shockwave to filter 212 when anchor assembly 200 secures one or more filters 212 at the second location.

In respect to the selective or dynamic moving of one or more filters 212 within container 202, liquid removal assembly may be selectively configured to perform the pressure differential, inwardly-directed suction, encouraging or potentiating passage of liquid through one or more filters 212, and/or potentiating accumulation of solid particles 206 to collect and agglomerate (or flocculate) at one or more filters 212 when one or more filters 212 is/are selectively or dynamically moved within container 202, as described above and in the present disclosure. Furthermore, shockwave assembly may be selectively configured to apply the shockwave to one or more filters 212 when one or more filters 212 is/are selectively or dynamically moved within container 202, such as in situations wherein the agglomerated (or flocculated) solid particles 206 are desired to be provided at the bottom of container 202, as illustrated in FIGS. 1A-E. Shockwave assembly may also be selectively configured to not apply the shockwave to one or more filters 212 when one or more filters 212 is/are selectively or dynamically moved within container 202, such as in situations wherein the agglomerated (or flocculated) solid particles 206 are desired to be removed and provided in a separate container 210 or location, as illustrated in FIG. 2B.

Method for Dewatering Solids and/or Solid Particles (e.g., Method 300)

Figure 3:
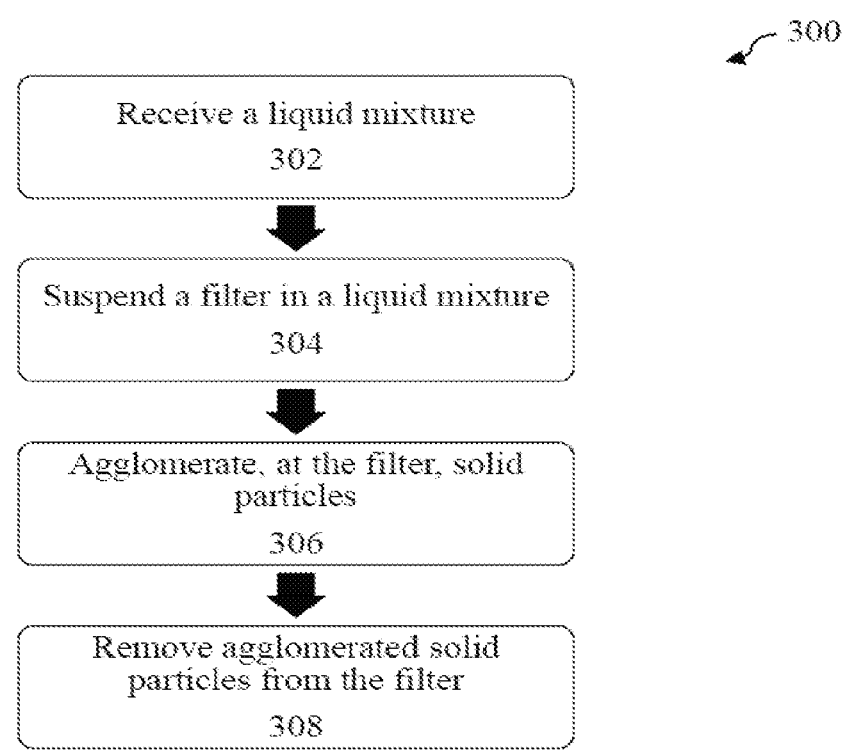
FIG. 3 illustrates a method for dewatering solids and/or solid particles in a contaminated liquid mixture, according to a specific example embodiment of the disclosure.

As illustrated in FIG. 3, method 300 for dewatering solids and/or solid particles may comprise receiving liquid mixture 104 (e.g., action 302), as described above and in the present disclosure. Liquid mixture 104 may be received in a container 102, or the like. Liquid mixture 104 may include solid particles 106. In some embodiments, the method 300 may be directed to a chemical-free process.

Method 300 may further comprise suspending one or more filters 112 of one or more filter assemblies 110 in liquid mixture 104 (e.g., action 304), as described above and in the present disclosure. One or more filters 112 may be suspended and secured in place at a first location in one or more of a plurality of ways. For example, one or more filters 112 may be secured to a portion of container 102 and/or cover for container 102. One or more filters 112 may also be secured by anchoring assembly 200. One or more filters 112 may also be moved and/or secured to other locations within container 102, and such may also be performed by the anchoring assembly 200 in example embodiments.

Method 300 may further comprise agglomerating (or flocculating), at one or more filters 112, solid particles 106 in liquid mixture 104 (e.g., action 306). Such agglomerating (or flocculating) (e.g., action 306) may be performed by liquid removal assembly 120, as described above and in the present disclosure. Agglomerating (or flocculating) may include encouraging or potentiating passage of liquid in liquid mixture 104 through filter 112 and potentiating accumulation of solid particles 106 in liquid mixture 104 to collect and agglomerate (or flocculate) at one or more filters 112 (i.e., at outwardly facing exterior surface 112a of one or more filters 112). Agglomerating (or flocculating) may include applying a pressure differential to potentiate passage of liquid in liquid mixture 104 through one or more filters 112 and potentiating accumulation of solid particles 106 in liquid mixture 104 to collect and agglomerate (or flocculate) at one or more filters 112 (i.e., at outwardly facing exterior surface 112a of one or more filters 112). Agglomerating (or flocculating) may include applying an inwardly-directed suction (or vacuum or suction force) at, in, and/or around the pores 112c of one or more filters 112, as well as in areas 112a' and 112b' and pipes 114 and 116. The pressure differential may be applied by liquid removal assembly 120, as described above and in the present disclosure. In example embodiments, the pressure differential may be applied by introducing a negative pressure between or at an area between one or more filters 112 and the outlet section 140. The pressure differential may also be applied by introducing a liquid suction between one or more filters 112 and external liquid outlet section 140. In some example embodiments, the pressure differential may also be applied by introducing a positive pressure into container 102, as illustrated in FIG. 1E. The pressure differential may be selectively applied based on a consideration of liquid flow through one or more filters 112, one or more filter assemblies 110, liquid removal section 120, and/or outlet section 140. For example, the pressure differential may be selectively applied when the flow rate of liquid passing through one or more filters 112, one or more filter assemblies 110, liquid removal section 120, and/or outlet section 140 exceeds a minimum threshold value. In example embodiments, the pressure differential may be selectively applied based on a consideration of solid particles 106 agglomerated (or flocculated) at one or more filters 112. For example, the consideration may include a consideration of the thickness of solid particles 106 agglomerated (or flocculated) at one or more filters 112. As another example, the consideration may include a consideration of the consistency of the layer of solid particles 106 agglomerated (or flocculated) at one or more filters 112. In some example embodiments, the pressure differential may also be applied on a periodic, intermittent, scheduled, or random basis, or based on visual inspections.

Method 300 may further comprise removing the agglomerated (or flocculated) solid particles 106 from one or more filters 112 (e.g., action 308), as described above and in the present disclosure. The removing of the agglomerated (or flocculated) solid particles 106 from one or more filters 112 (e.g., action 308) may be performed by applying a shockwave to one or more filters 112. Such applying of the shockwave to one or more filters 112 may be performed by shockwave assembly 130. The shockwave may be selectively applied based on a consideration of liquid flow through one or more filters 112, one or more filter assemblies 110, liquid removal section 120, and/or outlet section 140. For example, the shockwave may be selectively applied when the flow rate of liquid passing through one or more filters 112, one or more filter assemblies 110, liquid removal section 120, and/or outlet section 140 is below a minimum threshold value. In example embodiments, the shockwave may be selectively applied based on a consideration of solid particles 106 agglomerated (or flocculated) at one or more filters 112. For example, the consideration may include a consideration of the thickness of solid particles 106 agglomerated (or flocculated) at one or more filters 112. As another example, the consideration may include a consideration of the consistency of the layer of solid particles 106 agglomerated (or flocculated) at one or more filters 112. In some example embodiments, the shockwave may also be applied on a periodic, intermittent, scheduled, or random basis, or based on visual inspections. In example embodiments, the shockwave may be applied when liquid in the liquid mixture is not passing through one or more filters 112, one or more filter assemblies 110, liquid removal section 120, and/or outlet section 140. For example, a shockwave may be applied when one or more filters 112 may be suspended in liquid mixture 104 and liquid removal assembly 120 is configured to not perform the pressure differential, inwardly-directed suction, encouraging or potentiating passage of liquid through filter 112, and/or potentiating accumulation of solid particles 106 to collect and agglomerate (or flocculate) at one or more filters 112 when anchor assembly 200 secures one or more filters 112 at the first location. In other example embodiments, the shockwave may be applied when one or more filters 112 is removed from liquid mixture 104. For example, the shockwave may be applied when one or more filters 112 is moved from the first location to the second location, and such moving may be performed by anchor assembly 200, as illustrated in FIGS. 2A and 2B.

In some embodiments, a method for dewatering a solid and/or solid particles may continuously perform dewatering of solids and/or solid particles. According to some embodiments, a method for dewatering a solid and/or solid particles may be a continuous process. Continuous and/or continuously performing may comprise a duration of a method of dewatering a solid and/or solid particles, a duration in which a system for dewatering solids and/or solid particles is operating, a duration in which an assembly that may be used for dewatering solids and/or solid particles is operating, a duration in which a method is not dewatering a solid and/or solid particles, a duration in which a system is not dewatering solids and/or solid particles is operating, a duration in which an assembly that may be used for dewatering solids and/or solid particles is not operating, or combinations thereof. In some embodiments, advantages of continuously performing dewatering of solids and/or solid particles may comprise increasing productivity, increasing process stability, reducing downtime, increase yield, and lowering the cost of running.

According to some embodiments, a method for removing the agglomerated (or flocculated) solid particles 106 from one or more filters 112 (e.g., action 308), as described above, may be a continuous process. In some embodiments, a continuous process may comprise a duration of a method of dewatering a solid and/or solid particles, a duration in which a system for dewatering solids and/or solid particles is operating, a duration in which an assembly that may be used for dewatering solids and/or solid particles is operating, a duration in which a method is not dewatering a solid and/or solid particles, a duration in which a system is not dewatering solids and/or solid particles is operating, a duration in which an assembly that may be used for dewatering solids and/or solid particles is not operating, or combinations thereof.

Method of Configuring a System for Dewatering Solids and/or Solid Particles (e.g., Method 400)

Figure 4:
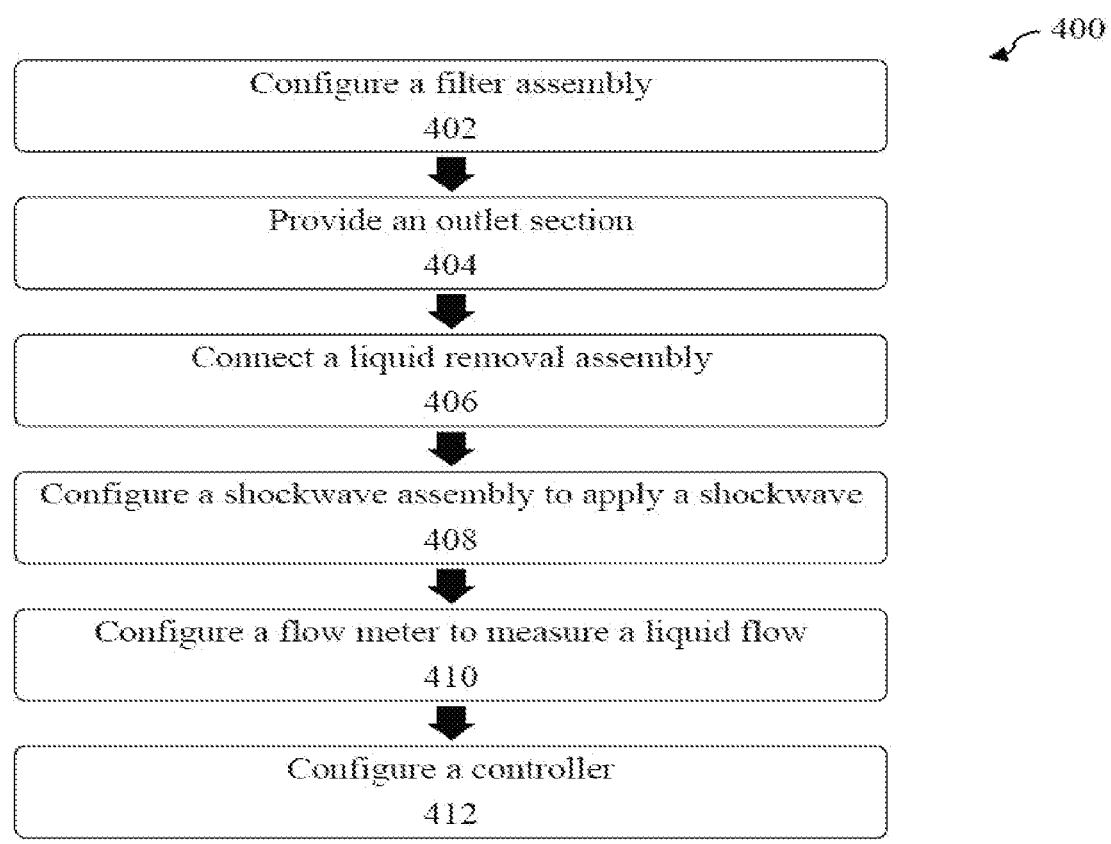
FIG. 4 illustrates a method for configuring a system for dewatering solids and/or solid particles in a contaminated liquid mixture, according to a specific example embodiment of the disclosure.

FIG. 4 illustrates method 400 of configuring a system, such as system 100, for dewatering solids and/or solid particles. Method 400 may comprise configuring one or more filter assemblies 110 in a dead end manner (e.g., action 402), as described above and in the present disclosure. One or more filter assemblies 110 may have one or more exposed filters 112 and a body 113 attached to one or more filters 112. One or more filters 112 may comprise a plurality of pores 112c.

Method 400 may further comprise providing an outlet section 140 (e.g., action 404). The outlet section 140 may be operable to receive liquid and discharge liquid. For example, the outlet section 140 may be operable to receive liquid from one or more filter assemblies 110 and discharge the received liquid to another location or container (not shown).

In some embodiments, method 400 may further comprise connecting a liquid removal assembly 120 to system 100 (e.g., action 406). Liquid removal assembly 120 may be connected between one or more filter assemblies 110 and the outlet section 140 in example embodiments.

Method 400 may further comprise configuring liquid removal assembly 120 to selectively apply an inward suction or inwardly-directed suction (e.g., action 406) at, in, and/or around the pores 112c of one or more filters 112, as well as in areas 112a' and 112b' and pipes 114 and 116. Liquid removal assembly 120 may also be configured to create a pressure differential, inwardly-directed suction, encouraging or potentiating passage of liquid through one or more filters 112, and/or potentiating accumulation of solid particles 106 to collect and agglomerate (or flocculate) at one or more filters 112, as described above and in the present disclosure.

Method 400 may further comprise configuring a shockwave assembly 130 to selectively apply a shockwave (e.g., action 408) to one or more filters 112 of one or more filter assemblies 110, as described above and in the present disclosure.

In some embodiments, a method may further comprise configuring a flow meter 150 to measure a liquid flow (e.g., action 410) through one or more filters 112, one or more filter assemblies 110, liquid removal section 120, and/or outlet section 140, as described above and in the present disclosure.

Method 400 may further comprise configuring a controller 160 (e.g., action 412). Controller 160 may be operable to configure liquid removal assembly 120 to selectively apply the inward suction or inwardly-directed suction. Controller 160 may be further operable to configure shockwave assembly 130 to selectively apply the shockwave. Controller 160 may be further operable to communicate with flow meter 140. Controller 160 may be further operable to configure liquid removal assembly 120 to selectively apply the inwardly-directed suction when the measured liquid flow exceeds a minimum threshold value. Controller 160 may be further operable to configure shockwave assembly 130 to selectively apply the shockwave when the measured liquid flow is below a minimum threshold value. Controller 160 may be any controller, computing device, and/or communication device, and may include a virtual machine, computer, node, instance, host, and/or machine in a networked computing environment. In some embodiments, method 400 may comprise a continuous process.

As will be understood by those skilled in the art who have the benefit of the instant disclosure, other equivalent or alternative compositions, devices, methods, and systems for dewatering solid particles in a contaminated liquid mixture can be envisioned without departing from the description contained herein. Accordingly, the manner of carrying out the disclosure as shown and described is to be construed as illustrative only.

Persons skilled in the art may make various changes in the shape, size, number, and/or arrangement of parts without departing from the scope of the instant disclosure. For example, the position and number of inlets, apertures, filters, gaskets, valves, pumps, containers, sensors, controllers, and/or outlets may be varied. In some embodiments, filters, seal gaskets, and/or filtration assemblies may be interchangeable. Interchangeability may allow the size and/or kind of contaminates to be custom adjusted (e.g., by varying or selecting the pore size and/or kind of filter used). In addition, the size of a device and/or system may be scaled up (e.g., to be used for high throughput commercial or municipal fluid filtration applications) or down (e.g., to be used for lower throughput household or research applications) to suit the needs and/or desires of a practitioner. Each disclosed method and method step may be performed in association with any other disclosed method or method step and in any order according to some embodiments. Where the verb "may" appears, it is intended to convey an optional and/or permissive condition, but its use is not intended to suggest any lack of operability unless otherwise indicated. Persons skilled in the art may make various changes in methods of preparing and using a composition, device, and/or system of the disclosure. For example, a composition, device, and/or system may be prepared and or used as appropriate for animals and/or humans (e.g., with regard to sanitary, infectivity, safety, toxicity, biometric, and other considerations). Elements, compositions, devices, systems, methods, and method steps not recited may be included or excluded as desired or required.

Also, where ranges have been provided, the disclosed endpoints may be treated as exact and/or approximations as desired or demanded by the particular embodiment. Where the endpoints are approximate, the degree of flexibility may vary in proportion to the order of magnitude of the range. For example, on one hand, a range endpoint of about 50 in the context of a range of about 5 to about 50 may include 50.5, but not 52.5 or 55 and, on the other hand, a range endpoint of about 50 in the context of a range of about 0.5 to about 50 may include 55, but not 60 or 75. In addition, it may be desirable, in some embodiments, to mix and match range endpoints. Also, in some embodiments, each figure disclosed (e.g., in one or more of the examples, tables, and/or drawings) may form the basis of a range (e.g., depicted value +/− about 10%, depicted value +/− about 50%, depicted value +/− about 100%) and/or a range endpoint. With respect to the former, a value of 50 depicted in an example, table, and/or drawing may form the basis of a range of, for example, about 45 to about 55, about 25 to about 100, and/or about 0 to about 100. Disclosed percentages are weight percentages except where indicated otherwise.

All or a portion of a device and/or system for dewatering solid particles in a contaminated liquid mixture may be configured and arranged to be disposable, serviceable, interchangeable, and/or replaceable. These equivalents and alternatives along with obvious changes and modifications are intended to be included within the scope of the present disclosure. Accordingly, the foregoing disclosure is intended to be illustrative, but not limiting, of the scope of the disclosure as illustrated by the appended claims.

The title, abstract, background, and headings are provided in compliance with regulations and/or for the convenience of the reader. They include no admissions as to the scope and content of prior art and no limitations applicable to all disclosed embodiments.

EXAMPLES

Some specific example embodiments of the disclosure may be illustrated by one or more of the examples provided herein.

Example 1: Dewatering Solids on a Plate Filter

An example embodiment of a filtration system was constructed with a flat sheet silicon carbide membrane. An air actuated diaphragm pump was included to pull a vacuum. Suspended solids consisted of coagulated tannins and lignins from groundwater. The flat sheet membrane was placed into the bucket with the suspended solid mixture and the vacuum pump was turned on. After 1-2 minutes, the flat sheet membrane was removed from the bucket, and held in the air. The vacuum pump continued to pump for nominally 10-12 seconds, at which point the cake on the membrane dewatered further (slightly), and water from the permeate (inside membrane) was exhausted out. After this was performed, the vacuum was stopped by isolating a valve, and then a shockwave was applied. The shockwave was nominally 0.5-1 second in duration with a pressure of 10 psi.

When the shockwave was applied, the solids fell off the membrane from the top down. As it dropped, it accumulated together on each side finally creating a large mass of solids as the total solids fell off the membrane. The dewatered mass had a consistency similar to cattle manure.

What is claimed is:

1. A method of dewatering solids comprising the steps of:
    submerging a filter having a plurality of pores and defining an interior volume, in a liquid mixture comprising a liquid and a plurality of solid particles;
    applying a suction force to the interior volume of the filter, causing the liquid to pass through the pores and into the interior volume of the filter while preventing the solid particles from passing through the pores, the solid particles agglomerating and forming a cake on an exterior surface of the filter;
    raising the filter out of, and above the liquid mixture while continuing to apply the suction force to the interior volume for 10-12 seconds after the filter is raised above the liquid mixture;

terminating the application of the suction force to the interior volume of the raised filter after the 10-12 seconds have passed; and applying shockwave pulses at a pressure of about 10 psi for a duration ranging from about 0.5 seconds to about 1 second to the filter while the filter is raised above the liquid mixture and after the application of the suction force is terminated, causing the cake to become dislodged and fall from the filter.

2. The method according claim 1, wherein the cake comprises at least one of a coagulated tanin and a coagulated lignin.

3. The method according claim 1, further comprising receiving the cake dislodged from the filter with a collection container.

4. The method according to claim 1, applying the suction force to the interior volume of the filter is done for a duration ranging from about 1 minute to 2 minutes before raising the filter out of, and above the liquid mixture.

5. The method according to claim 1, wherein the filter comprises a flat sheet membrane made of at least one of a silicon carbide and an alumina.

6. The method according to claim 1, wherein the filter comprises a ceramic membrane made of at least one of a silicon carbide and an alumina.

* * * * *